US006993628B2

(12) United States Patent
Starke

(10) Patent No.: US 6,993,628 B2
(45) Date of Patent: *Jan. 31, 2006

(54) CACHE ALLOCATION MECHANISM FOR SAVING ELECTED UNWORTHY MEMBER VIA SUBSTITUTE VICTIMIZATION AND IMPUTED WORTHINESS OF SUBSTITUTE VICTIM MEMBER

(75) Inventor: William John Starke, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 398 days.

This patent is subject to a terminal disclaimer.

(21) Appl. No.: 10/425,442

(22) Filed: Apr. 28, 2003

(65) Prior Publication Data

US 2004/0215887 A1    Oct. 28, 2004

(51) Int. Cl.
  *G06F 12/12*  (2006.01)
(52) U.S. Cl. ...................................... 711/134; 711/136
(58) Field of Classification Search .................. None
  See application file for complete search history.

(56) References Cited

U.S. PATENT DOCUMENTS

| 5,900,011 A | * | 5/1999 | Saulsbury et al. | .......... | 711/119 |
| 5,974,507 A | * | 10/1999 | Arimilli et al. | ............. | 711/133 |
| 6,145,057 A | * | 11/2000 | Arimilli et al. | ............. | 711/133 |
| 6,345,339 B1 | * | 2/2002 | Arimilli et al. | ............. | 711/141 |
| 6,408,362 B1 | * | 6/2002 | Arimilli et al. | ............. | 711/133 |
| 2004/0073760 A1 | * | 4/2004 | Arimilli et al. | ............. | 711/163 |

OTHER PUBLICATIONS

Cargnoni et al., Cache Allocation Mechanism for Saving Multiple Elected Unworthy Members via Substitute Victimization and Imputed Worthiness of Multiple Substitute Victim Members.
Arimilli et al., Programming Means for Dynamic Specification of Cache Management Preferences.
Cargnoni et al., Cache Allocation Mechanism for Biasing Subsequent Allocations Based Upon Cache Directory State.

* cited by examiner

*Primary Examiner*—Kevin Verbrugge
*Assistant Examiner*—Daniel Ko
(74) *Attorney, Agent, or Firm*—Duke W. Yee; Mark E. McBurney

(57) ABSTRACT

A method and apparatus in a data processing system for protecting against a displacement of one type of cache line using a least recently used cache management process. A first member in a class of cache lines is selected as a substitute victim. The substitute victim is unselectable by the least-recently-used cache management process, and the substitute victim is associated with a second member in the class of cache lines. The substitute victim is replaced in response to a selection of the second member as a victim in response to a cache miss in the data processing system, wherein the second member remains in the class of cache lines.

19 Claims, 20 Drawing Sheets

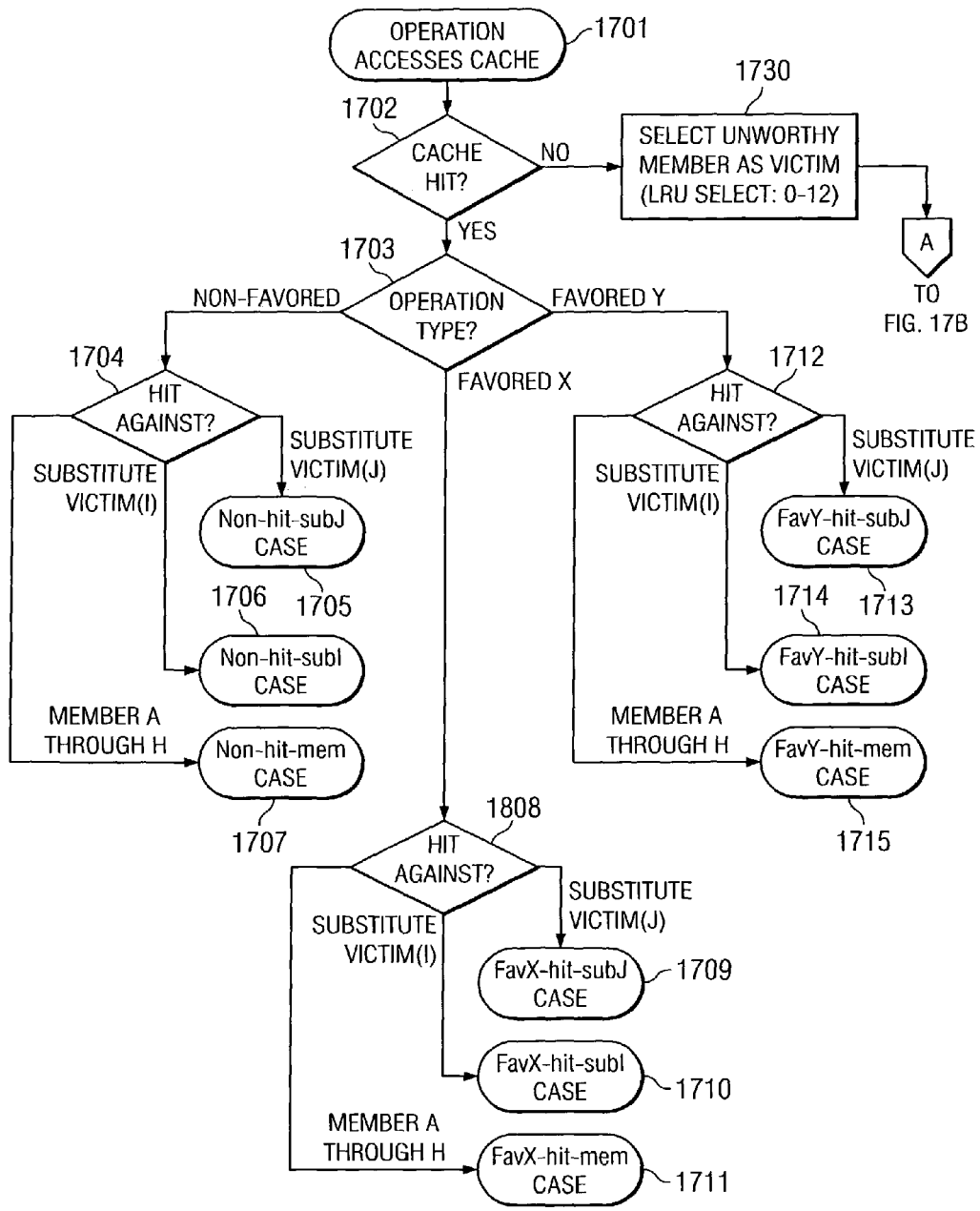

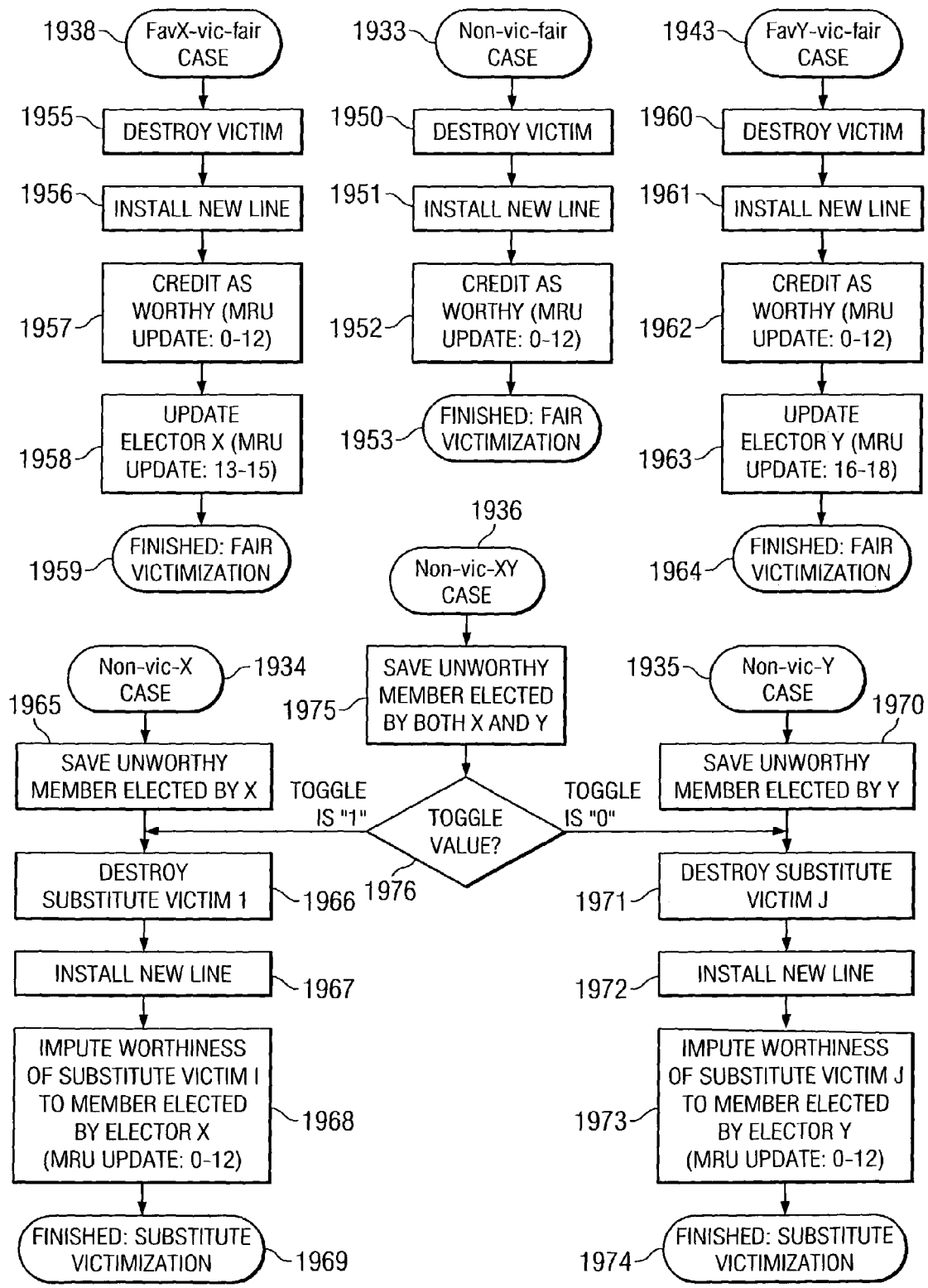

CACHE ALLOCATION MECHANISM FOR SAVING ELECTED UNWORTHY MEMBER VIA SUBSTITUTE VICTIMIZATION AND IMPUTED WORTHINESS OF SUBSTITUTE VICTIM MEMBER

CROSS REFERENCE TO RELATED APPLICATIONS

The present invention is related to the following applications entitled: "Cache Allocation Mechanism for Saving Multiple Elected Unworthy Members via Substitute Victimization and Imputed Worthiness of Multiple Substitute Victim Members", Ser. No. 10/425,444; "Programming Means for Dynamic Specification of Cache Management Preferences", Ser. No. 10/425,443; and "Cache Allocation Mechanism for Biasing Subsequent Allocations Based Upon Cache Directory State" Ser. No. 10/425,459; all filed even date hereof, assigned to the same assignee, and incorporated herein by reference.

BACKGROUND OF THE INVENTION

1. Technical Field

The present invention relates generally to an improved data processing system, and in particular, to an improved method and apparatus for caching data in a memory.

2. Description of Related Art

Most early data processing systems consisted basically of a central processing unit, a main memory, and some sort of secondary input/output ("I/O") capability. In these earlier systems, the main memory was the limiting element. Typically, the main memory was designed first and the CPU was then created to match the speed of the memory. This matching was performed to optimize the processing speed and is necessary even with today's high speed computers. Over time, logic circuit speeds increased along with the capacity requirements of main memory. With the need for increasing capacity in the main memory, the speed of the main memory could not keep up with the increasing speed of the CPU. Consequently, a gap developed between the main memory and the processor cycle time, which resulted in un-optimized processing speeds. As a result, a cache memory was developed to bridge the gap between the memory and the processor cycle time.

Using a cache to bridge the performance gap between a processor and main memory has become important in data processing systems of various designs from personal computers to work stations to data processing systems with high performance processors. A cache memory is an auxiliary memory that provides a buffering capability through which a relatively slow main memory can interface with a processor at the processor's cycle time to optimize the performance of the data processing system. Requests are first sent to the cache to determine whether the data or instructions requested are present in the cache memory. A "hit" occurs when the desired information is found in the cache. A "miss" occurs when a request or access to the cache does not produce the desired information. In response to a miss, one of the cache "lines" is replaced with a new one. The method to select a line to replace is called a replacement policy.

A number of different schemes for organizing a cache memory exist. For example, a fully associative mapping organization may be employed whereby a data address may exist in any location in the cache, or a direct mapping scheme may be employed in a cache memory whereby a data address may exist in only one location in the cache. A set associative scheme may be employed by partitioning the cache into distinct classes of lines, wherein each class contains a small fixed number of lines. This approach is somewhere between a direct mapped and a full associative cache. The classes of lines are usually referred to as "congruence classes." The lines in a congruence class are usually referred to as sets (which indicate the number of locations an address can reside) in a congruence class in a set associative cache.

One generally used type of replacement policy is the least-recently-used (LRU) policy. An LRU policy is built upon the premise that the least recently used cache line in a congruence class is the least worthy of being retained. So, when it becomes necessary to evict a cache line to make room for a new one, an LRU policy chooses as a victim a cache line which is the least recently accessed set (or member) within a congruence class.

For an LRU policy, two types of operations must be carried out against the LRU state (which is maintained for each congruence class in a cache).

A most-recently-used-update (MRU-update) operation typically occurs due to a cache hit. It adjusts the LRU state such that the "hit" member is ordered ahead of all other members in that congruence class, establishing the cache line in that member position as the most worthy member in the congruence class.

A least-recently-used-victim-selection (LRU-victim-selection) operation typically occurs when a cache miss requires that a member be allocated to hold a cache line arriving from elsewhere in the storage hierarchy. The operation determines which cache line is the least worthy of being retained in the congruence class, evicts that cache line, and places the newly arriving cache line in its member position.

Several factors complicate the behavior of LRU replacement policies in multi-level cache hierarchies, particularly when those hierarchies contain nth level caches that are shared by multiple structures at level n−1. For example, a processor may contain a first level instruction cache and a first level data cache. These may be backed by a second level cache that includes both instructions and data. Such a structure is designed for the following purpose: so that processor requests for cache lines that miss in the first level caches have a high likelihood of being found in the second level cache.

As described earlier, the LRU replacement policy in the first level caches would update as most-recently-used those cache lines that are used most often by the processor. Cache lines that are less important (or worthy) to the processor, since they are used less often, would be less likely to be marked as most-recently-used. Thus, the more frequently used lines tend to remain in the first level cache, while the less frequently used lines tend to be evicted from the first level cache.

The LRU policy in the second level cache would update as most-recently-used those cache lines that are requested from the second level cache when a first level cache miss occurs. These lines would tend to be those lines which were evicted from the first level cache, and are less worthy to the processor than the cache lines which tend to hit in the first level caches. Thus, the cache lines that most often are not found in the first level caches, but are repeatedly needed by the processor, are the cache lines most likely to remain in the second level cache, due to the fact that they are more likely to be beneficially affected by MRU-updates.

Ironically then, the cache lines which are most worthy to the processor are less likely to benefit from MRU-updates in the second level cache, and hence, are more likely to be evicted from the second level cache than the cache lines which are less worthy to the processor.

This behavior can be quite pronounced when multiple first level (or n−1 level) caches are backed by the same second level (or nth level) cache, especially when those first level caches have differing patterns of miss traffic. For example, many applications have small instruction footprints but high rates of data turnover (i.e., data footprints that exceed the size of the second level cache), resulting in very few first level instruction cache misses relative to first level data caches misses, and requiring that significantly less capacity in the second level cache be allocated for instructions than for data.

In such an application, even though instructions require a smaller portion of the second level cache, the fact that the first level instruction cache seldom misses, combined with the fact that the first level data frequently misses and that the data footprint exceeds the capacity of the second level cache, the instructions, so well behaved in the level instruction cache, would tend to be evicted from the larger, shared, second level cache. Such application behaviors will hereafter be referred to as "unbalanced" caching behaviors.

Another type of application might have an instruction footprint that is too large to be contained in the first level instruction cache and a data footprint that is too large to be contained in the first level data cache. In this case, both instruction and data caches miss frequently enough relative to each other to better balance the likelihood of MRU-updates in the second level cache for instruction cache lines versus for data cache lines. The natural pattern of requests fairly balances the allocation of second level cache capacity between instruction cache lines and data cache lines, with this allocation more accurately representing the true worthiness of these cache lines to the processor. Such application behaviors will hereafter be referred to as "balanced" caching behaviors.

Inclusion occurs if a block of data is present in an L1 cash of a given processing unit, and this block of data also is present in other caches, such as the L2 and L3 caches, of that processing unit. It a system structure requires the property of inclusion between the second level cache and the first level caches, there can be significant performance consequences to applications with unbalanced caching behaviors. When cache lines, well behaved in a first level cache and important to the processor, are evicted from the second level cache (since they seldom receive the benefit of an MRU-update in the second level cache), inclusion dictates that they must be evicted from the first level cache as well.

In some cases, this has been overcome by limiting inclusion to data, and architecting software managed coherency schemes for instructions, or in other cases, by directly snooping first level caches. As the number of processors in a system increases, such schemes become less and less viable.

Further, if a second level cache is shared by multiple processors (or processing threads), the caching (i.e., performance) behaviors can be negatively affected by the level of "balance" between instructions and data within the application thread on any given processor as well as the relative "balance" between the application threads as a whole. Conversely, caching behaviors can be positively impacted when multiple application threads share data or instructions.

Those of ordinary skill in the art will recognize numerous schemes for biasing to overcome the consequences of unbalanced behaviors in fully inclusive caches, both within an application thread or amongst multiple such threads. Such schemes typically involve establishing multiple cache partitions and restricting the use of those partitions to certain types of operations. This can be accomplished by augmenting a standard replacement policy, such as LRU, to respect the partitions.

For example, a small fixed size region of the second level cache can be restricted for use by instruction cache lines only, with the remainder allocated to other (e.g., data) cache lines. Such an approach provides benefit to an "unbalanced" application. Such an approach might be detrimental to a well balanced application whose instruction footprint exceeds the capacity of the small fixed size region. Increasing the size of the region dedicated for instructions in response to this concern might be detrimental to the "unbalanced" application or to a "balanced" application with a larger ratio of data footprint size relative to instruction footprint size, since increasing the instruction region would decrease the data region.

In the case of multiple processors, a second level cache might be divided into equal sized partitions, one for each processor. Such an approach can possibly provide benefit when "unbalanced" and "balanced" applications of varying degrees share a second level cache. Such an approach can be detrimental when one application has significantly less demand for the second level cache than another application, but that other application is prevented from utilizing any of the second level cache outside of its allotted partition. Such an approach might also reduce the synergy that might otherwise occur when multiple application threads exhibit a high degree of sharing of instructions and/or data.

While static partitioning schemes in shared, second level, inclusive, caches can improve performance for applications with unbalanced caching behaviors, these same schemes can be detrimental to the performance of other applications with different levels of balance or sharing.

Therefore, it would be advantageous to have an improved method, apparatus, and computer instructions to dynamically manage caching behavior in a data processing system to improve performance.

SUMMARY OF THE INVENTION

The present invention provides a method and apparatus in a data processing system for protecting against a displacement of one type of cache line using a least recently used cache management process. A first member in a class of cache lines is selected as a substitute victim. The substitute victim is unselectable by the least-recently-used cache management process, and the substitute victim is associated with a second member in the class of cache lines. The substitute victim is replaced in response to a selection of the second member as a victim in response to a cache miss in the data processing system, wherein the second member remains in the class of cache lines.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 17A–B are a diagram of operation accesses to a cache in accordance with a preferred embodiment of the present invention;

FIG. 19 is a diagram of processes used to select a victim in which an election pointer is employed in the selection process in accordance with a preferred embodiment of the present invention.

DETAILED DESCRIPTION OF THE PREFERRED EMBODIMENT

Figure 1:
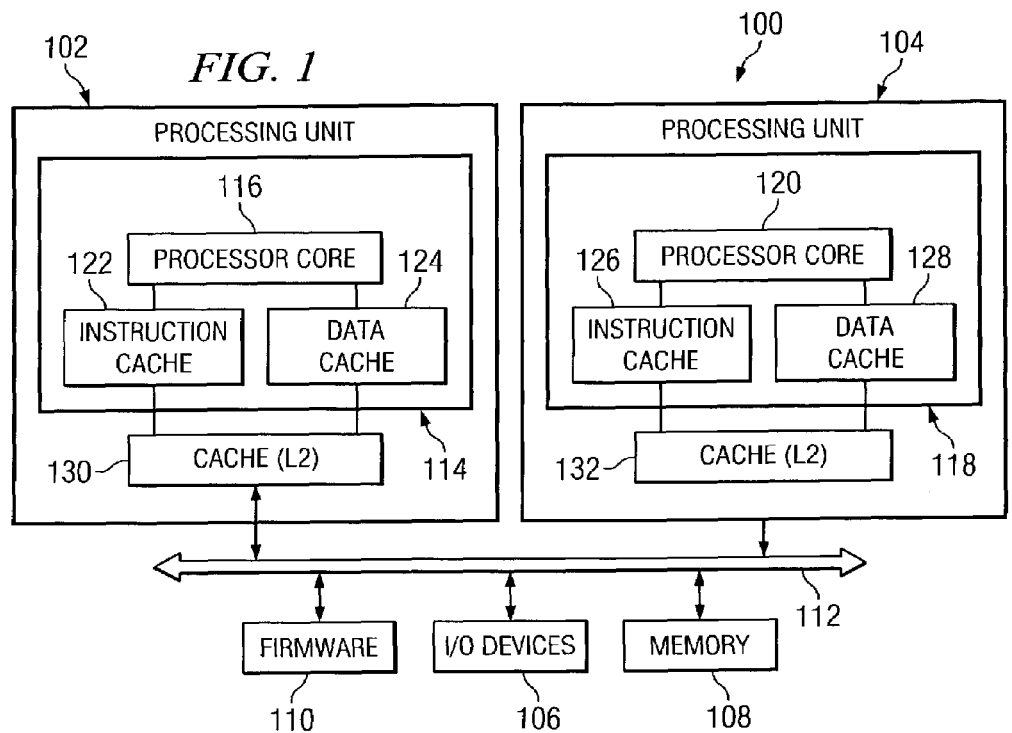
FIG. 1 is a block diagram of a data processing system in which a preferred embodiment of the present invention may be implemented.

With reference now to the figures and in particular with reference to FIG. 1, a block diagram of a data processing system is depicted in which a preferred embodiment of the present invention may be implemented. As illustrated, data processing system 100 is an example of a conventional multi-processor computer system. Data processing system 100 has several processing units, two of which, processing unit 102 and processing unit 104 are depicted. These processing units are connected to various peripheral devices, including input/output (I/O) devices 106 used to communicate with a user, memory 108 used by the processing units to carry out program instructions, and firmware 110 whose primary purpose is to seek out and load an operating system from one of the peripherals whenever the computer is first turned on. I/O devices 106 may take various forms, such as a display monitor, keyboard, and permanent storage device.

Processing units 102 and 104 communicate with the peripheral devices by various means, including, for example, a generalized interconnect or bus 112. Data processing system 100 may have many additional components which are not shown, such as serial and parallel ports for connection to devices, such as modems or printers. Those of ordinary skill in the art will further appreciate that there are other components that might be used in conjunction with those shown in the block diagram of FIG. 1. For example, a display adapter might be used to control a video display monitor, and a memory controller may be used to access memory 108. The data processing system also can have more than two processing units.

In a symmetric multi-processor (SMP) computer, all of the processing units are generally identical. In other words, the processors all use a common set or subset of instructions and protocols to operate, and generally have the same architecture. A typical architecture is shown in FIG. 1. In these examples, a processing unit 102 includes integrated chip 114, which contains processor core 116, and processing unit 104 contains integrated circuit 118, which contains processing core 120, instruction cache 126, and data cache 128. Processor cores 116 and 124 include registers and execution units. These components are used to carry out program instructions to operate data processing system 100.

As illustrated, processing unit 102 and processing unit 104 also include caches, such as instruction cache 122, data cache 124, instruction cache 126, and data cache 128, within integrated circuits 114 and 118 in FIG. 1. These caches are implemented using high speed memory devices. Caches are commonly used to temporarily store values that might be repeatedly accessed by a processor, to speed up processing by avoiding the longer step of loading the values from memory 108. These caches also are referred to as "on-board" when they are integrally packaged with the processor core on a single integrated chip. In these examples, the caches located within integrated circuit 114 and integrated circuit 118 are level 1 (L1) caches. Each cache is associated with a cache controller (not shown) that manages the transfer of data between the processor core and the cache memory.

A processing unit can include additional caches. For example, processing unit 102 includes cache 130 and processing unit 104 includes cache 132, which are referred to as level 2 (L2) caches because these memories support the on-board or L1 caches. In other words, cache 130 and cache 132 act as intermediaries between memory 108 and the on-board L1 caches: instruction cache 122, data cache 124, instruction cache 126, and data cache 128. These L2 caches can store a much larger amount of information, such as instructions and data, than the on-board caches can, but with a longer access penalty. For example, cache 130 and cache 132 may be integrated in chips having a storage capacity of 256 or 512 kilobytes, while instruction cache 122 and data cache 124 in processing unit 102, and instruction cache 126 and data cache 128 in processing unit 104 may have 64 kilobytes of total storage.

As illustrated, both cache 130 and cache 132 are connected to bus 112. All loading of information from memory 108 into processor core 116 passes through cache 130, while all loading of information into processor core 120 passes through cache 132. Although FIG. 1 depicts only a two-level cache hierarchy, multi-level cache hierarchies can be provided where there are many levels of serially connected caches. For example, L3, L4, and L5 caches may be used.

In an SMP computer, providing a coherent memory system is important. In other words, it is important to cause write operations to each individual memory location to be serialized in some order for all processors. For example, assume a location in memory is modified by a sequence of write operations to take on the values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent". Virtually all coherency protocols operate only to the granularity of the size of a cache block. That is to say, the coherency protocol controls the movement of and write permissions for data on a cache block basis and not separately for each individual memory location.

A number of protocols and techniques for achieving cache coherence are known. At the heart of all these mechanisms for maintaining coherency is the requirement that the protocols allow only one processor to have a "permission" that allows a write to a given memory location (cache block) at any given point in time. As a consequence of this requirement, whenever a processor attempts to write to a memory location, the processor must first inform all other processors of its desire to write the location and receive permission from all other processors to carry out the write. The key issue is that all other processors in the system must be informed of the write by the initiating processor before the write occurs. Furthermore, if a block is present in the L1 cache of a given processing unit, this block is also present in the L2 and L3 caches of that processing unit. This property is known as inclusion and is well known to those of ordinary skill in the art.

To implement cache coherency in a system, the processors communicate over a common generalized interconnect, such as bus 112. The processors pass messages over the interconnect indicating their desire to read or write memory locations. When an operation is placed on the interconnect, all of the other processors "snoop" (monitor) this operation and decide if the state of their caches can allow the requested operation to proceed and if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

Figure 2:
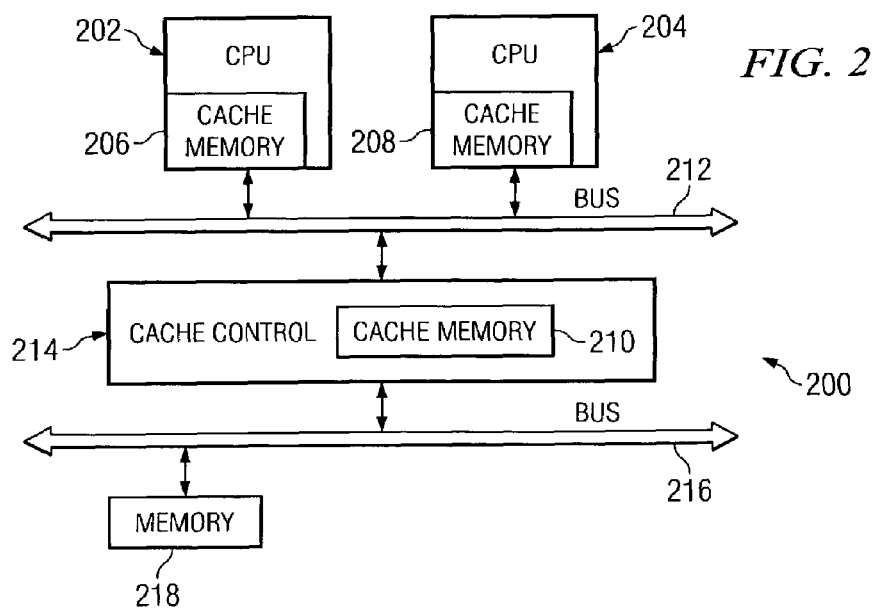
FIG. 2 is a diagram of another data processing system in which the present invention may be implemented.

With reference now to FIG. 2, a diagram of another data processing system is depicted in accordance with a preferred embodiment of the present invention. The processes and apparatus of the present invention may also be implemented within data processing system 200. This particular example, illustrated a shared L2 cache, while data processing system 100 in FIG. 1 illustrated unshared caches.

In this example, data processing system 200 includes two processors, processor 202 and processor 204. Cache memory 206 and cache memory 208 are cache memories located within processor 202 and processor 204, respectively. In this example, cache memory 210 is a level 2 cache memory that is shared by both processors. Access to this cache memory is provided by bus 212. Cache control 214 contains the logic for handling cache lines within memory 210 in response to requests from processors 202 and 204. Cache control 214 is connected to other components through bus 216. For example, firmware 218, I/O devices 220 and memory 222 are connected to bus 216.

Data processing system 100 and data processing system 200 include mechanisms for handling cache lines. A cache line is a unit of data that is retrieved from memory to a cache. A cache line is typically the smallest unit of data that may be sent from a memory to a cache. The present invention provides a method, apparatus, and computer instructions for supplementing least recently used (LRU) policies applied to handling cache lines in a cache.

An LRU policy, by definition, must maintain an ordered list of all members within each congruence class. The vector consists of one bit for each possible pair of entities. The bit indicates the relative ordering within the pair. That is, for a given pair (i, j) the bit might be set to a "one" value if entity j precedes entity i, and the bit might be cleared to a "zero" value if entity i precedes entity j.

Figure 3:
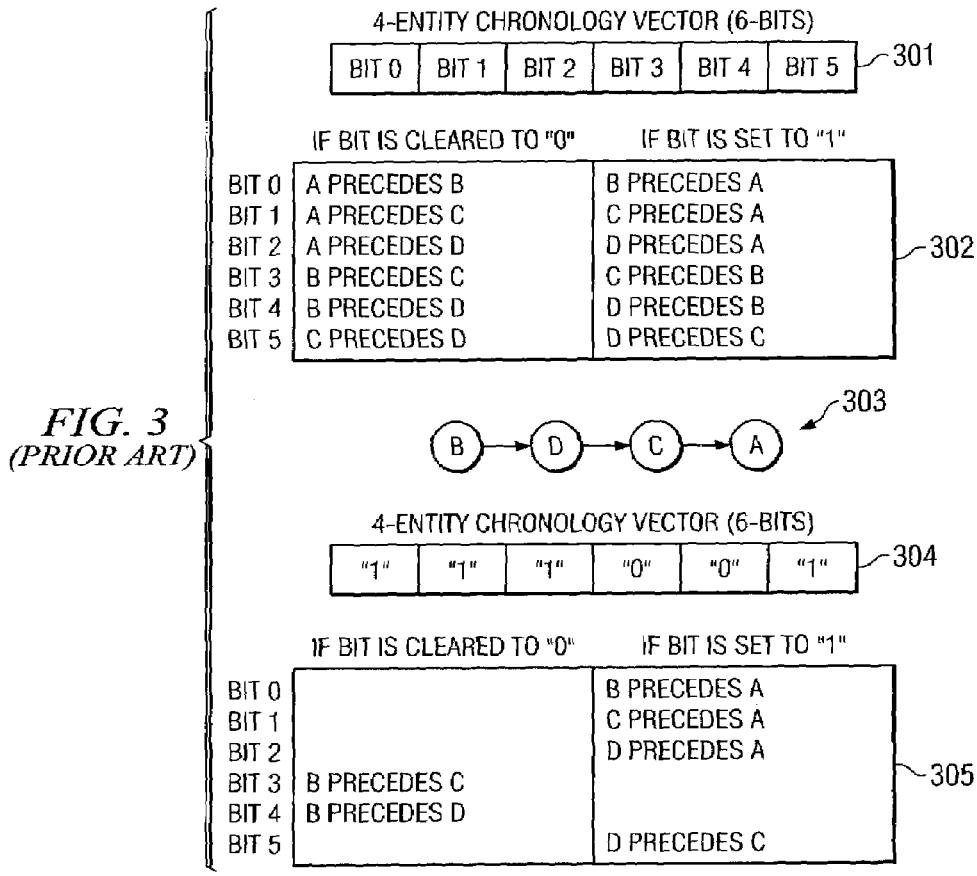
FIG. 3 is a diagram of components used in ordering entities.

For example, referring now to FIG. 3, components used in ordering entities are illustrated. Chronology vector 301 indicates an ordering between four entities (a, b, c, d) and consists of six bits. Referring to table 302, bit 0 indicates the ordering between entities a and b, bit 1 indicates the ordering between entities a and c, bit 2 indicates ordering between a and d, bit 3 indicates ordering for b and c, bit 4 is used in ordering b and d, and bit 5 indicates ordering between c and d.

To specify the ordering of members in ordering 303 as follows: b, d, c, a, the vector 304 would have the value: "111001", indicating an order specified by the rules 305 for each chronology bit.

In general, a vector of chronology bits for determining the ordering amongst n entities requires $(n \times (n-1))/2$ bits.

Applying this technique to implement a "true" LRU policy for a 2-way associative cache requires a 1-bit vector; or for a 3-way cache requires a 3-bit vector; or 4-way: 6-bits; or 5-way: 10-bits; or 8-way: 28-bits; or 16-way: 120-bits.

While chronology bits do not provide the most efficient possible bit-encoding (e.g., an encoding requiring the smallest number of bits), they do possess attributes ideally suited to a fast and inexpensive circuit implementation.

With a chronology vector implementation, an MRU-update operation is accomplished by setting a subset of the bits in the vector to a constant pattern (associated with the updated member) while leaving the other bits in the vector unchanged. The subset is comprised of the n−1 bits (where n is the associativity of the cache) which define the ordering between the updated member and each of the other members in the congruence class.

Figure 4A:
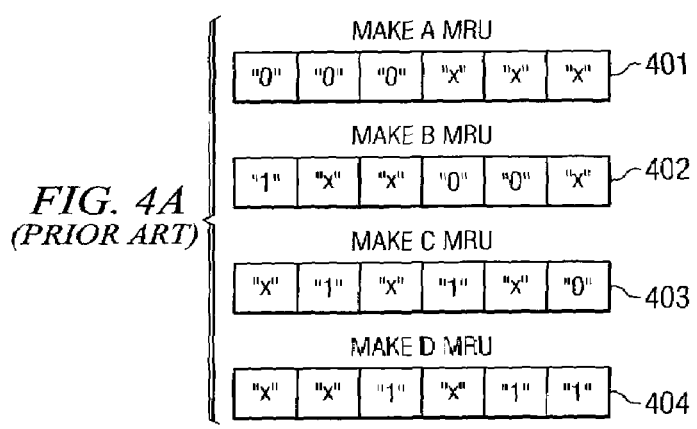
FIG. 4A is a diagram of constant patterns.
Figure 4B:
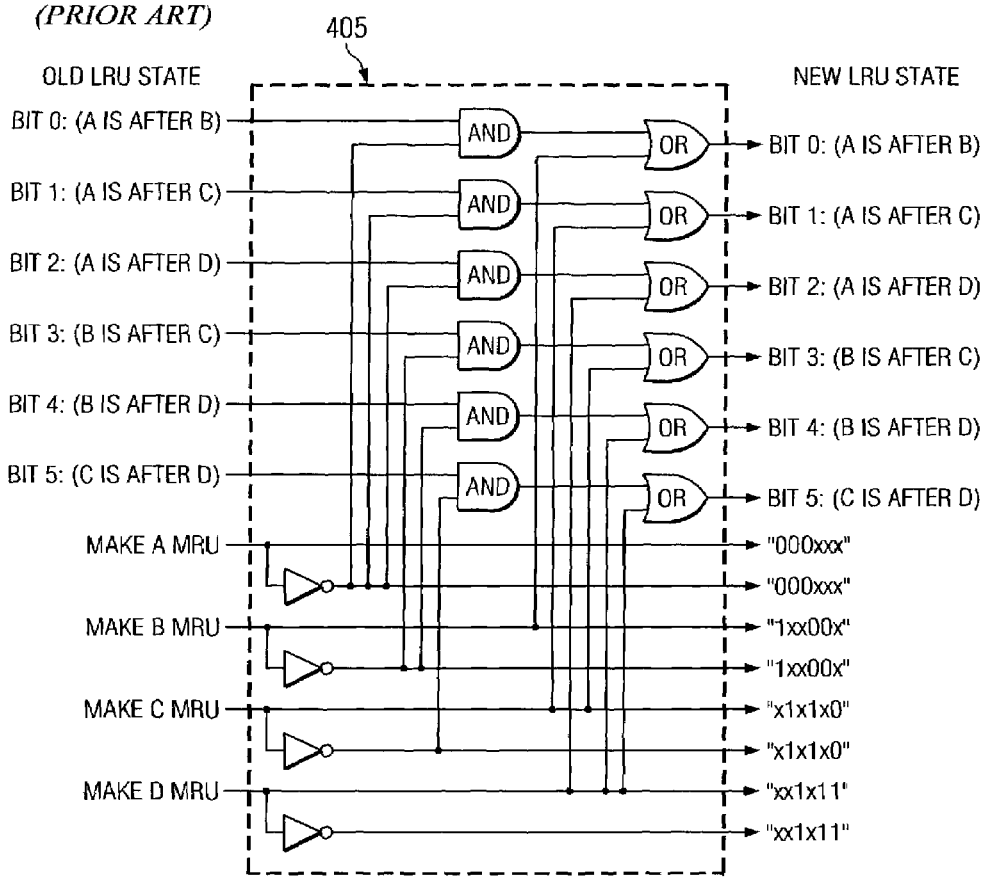
FIG. 4B is a circuit diagram of a known MRU-update function.

For example, referring now to FIG. 4A, the constant patterns are shown for a 401, b 402, c 403, and d 404. Turning next to FIG. 4B, circuit diagram 405 illustrates the MRU-update function in a manner familiar to those of ordinary skill in the art. Constant patterns 401, 402, 403, and 404, from FIG. 4A are used to annotate the control lines in circuit diagram 405 in FIG. 4B to associate each constant pattern with the set of control lines that establish that pattern into the LRU state.

With a chronology vector implementation, an LRU-victim-selection operation is accomplished by implementing an equation for each member position. The equation for a given member tests the same subset of n−1 bits (described above)

associated with that member in the MRU-update operation, i.e., those bits which define the ordering between the member and each of the other members in the congruence class. The equation compares the tested bits against a constant pattern, returning "true" if there is a match, and returning "false" if there is not a match. One and only one of the equations will return a "true" value. The member position associated with that equation is the victim member position.

Figure 5A:
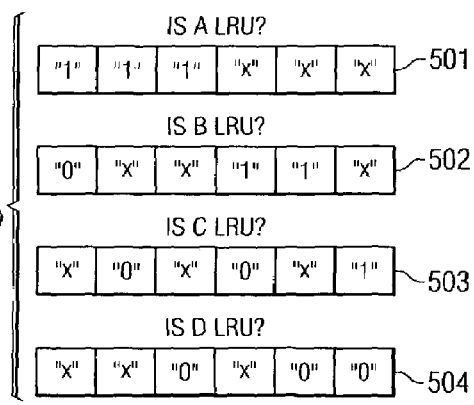
FIG. 5A is a diagram of constant patterns.
Figure 5B:
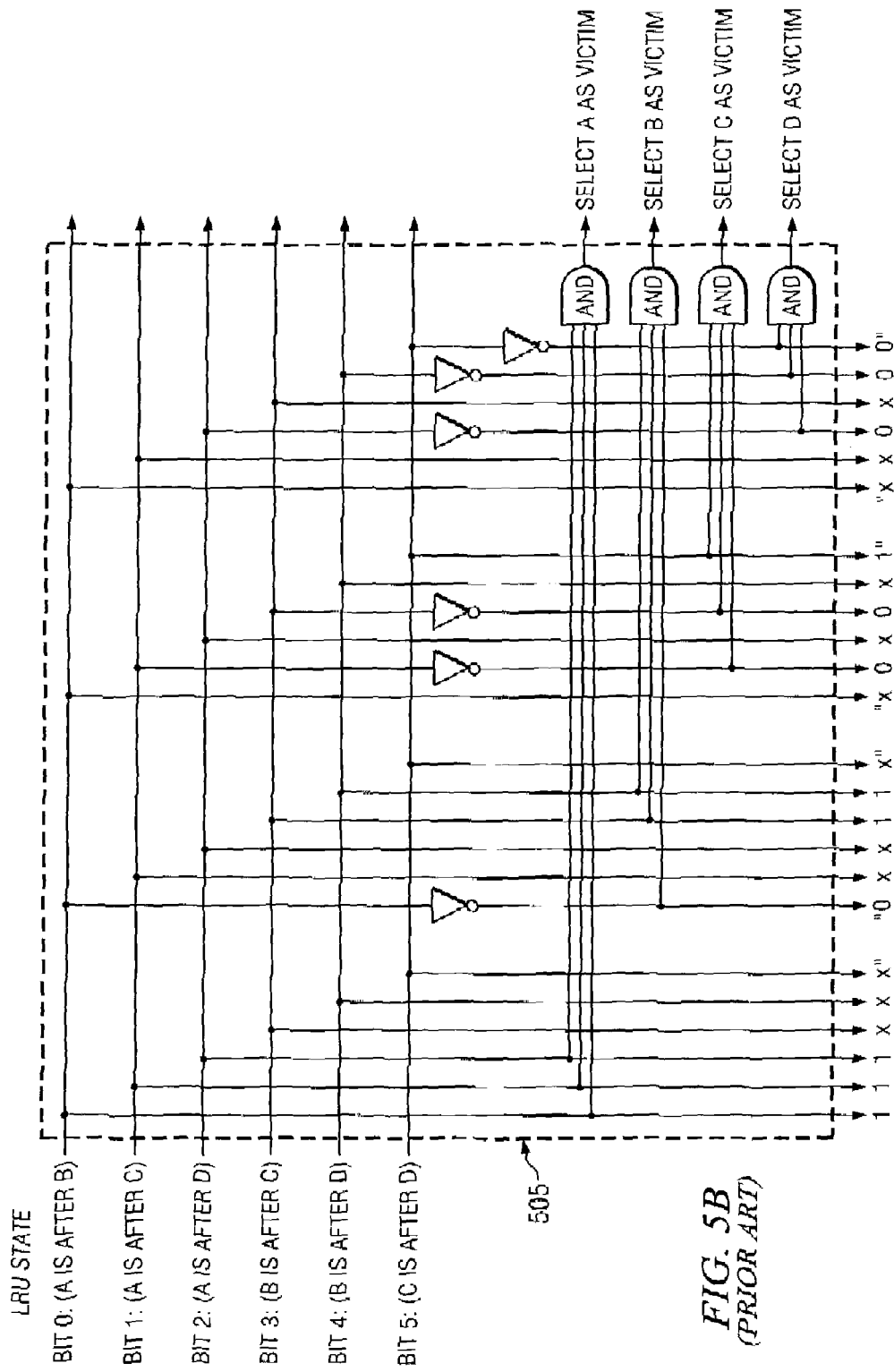
FIG. 5B is a circuit diagram of a known LRU-victim-selection function.

For example, referring now to FIG. 5A, the constant patterns are shown for a 501, b 502, c 503, and d 504. With reference to FIG. 5B, circuit diagram 505 illustrates the LRU-victim-selection function in a manor familiar to those of ordinary skill in the art. Constant patterns 501, 502, 503, and 504, from FIG. 5A are used to annotate the information lines in circuit diagram 505 in FIG. 5B to associate each constant pattern with the set of information lines that feeds the constant comparator equation for that pattern.

As associativity increases the chronology vector technique can become prohibitively expensive. Those skilled in the art will recognize that less expensive "pseudo-LRU" policies are possible, which policies are roughly equal in "true" LRU behavioral value, but may be implemented in hardware with fewer bits required to track LRU state.

One such policy, well known in the art, is the tree-based pseudo-LRU approach. In this hierarchical approach, a set of multiple chronology vectors are organized as a tree of arbitrary depth. For non-leaf nodes of the tree, the number of branches from the node is equal to the number of entities ordered by the vector. Each leaf node of the tree defines the order amongst a subset of the members in a congruence class equal in number to the ordering capacity of the vector.

Figure 6:
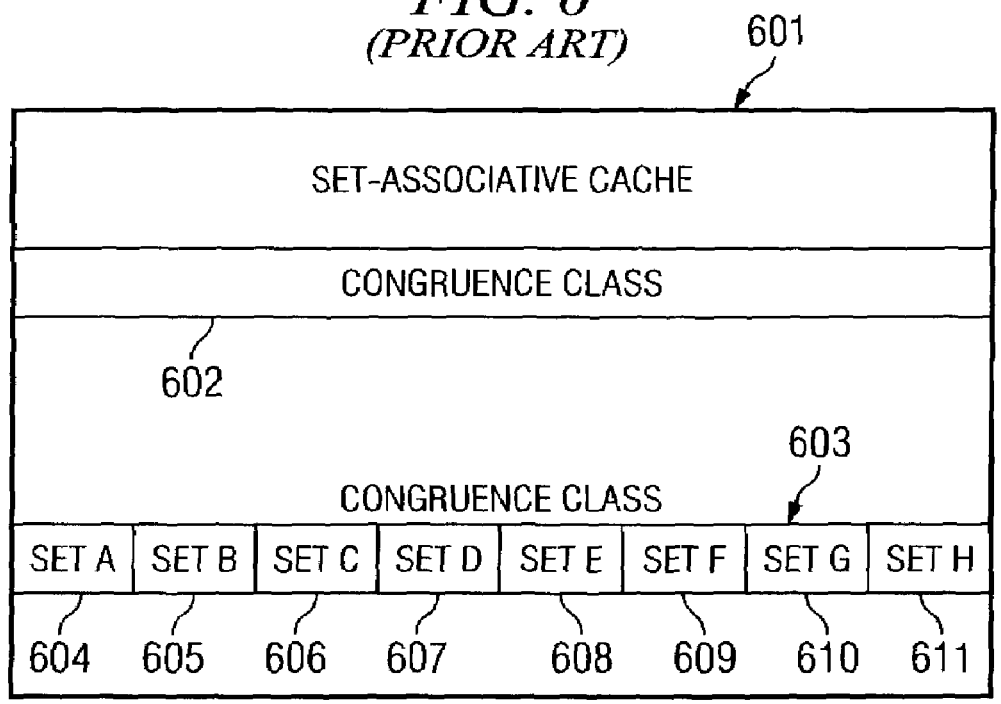
FIG. 6 is a diagram of an 8-way associative cache.

To illustrate this, referring now to FIG. 6, an 8-way associative cache 601 is shown. Cache 601 is comprised of multiple congruence classes 602 and 603, which are typically selected by a subset of the address of the cache line being referenced. Each congruence class is comprised of eight members, member A 604, member B 605, member C 606, member D 607, member E 608, member F 609, member G 610, and member H 611.

Often, tree-based LRU implementations are comprised of single bit (2-entity) chronology vectors. For example, referring now to FIG. 7, examples of tree based LRU structures are illustrated. In this example, vector 700 forms the basis for each node in a binary tree 702, which is 3 levels deep in this example. Binary tree 702 contains nodes 704, 706, 708, 710, 712, 714, and 716. Seven single hit vectors, vectors 718, 720, 722, 724, 726, 728, and 730, are provided to track the state for a binary-tree LRU scheme governing the 8-way associative cache with member positions A 732, B 734, C 736, D 738, E 740, F 742, G 744, and H 746.

Figure 7:
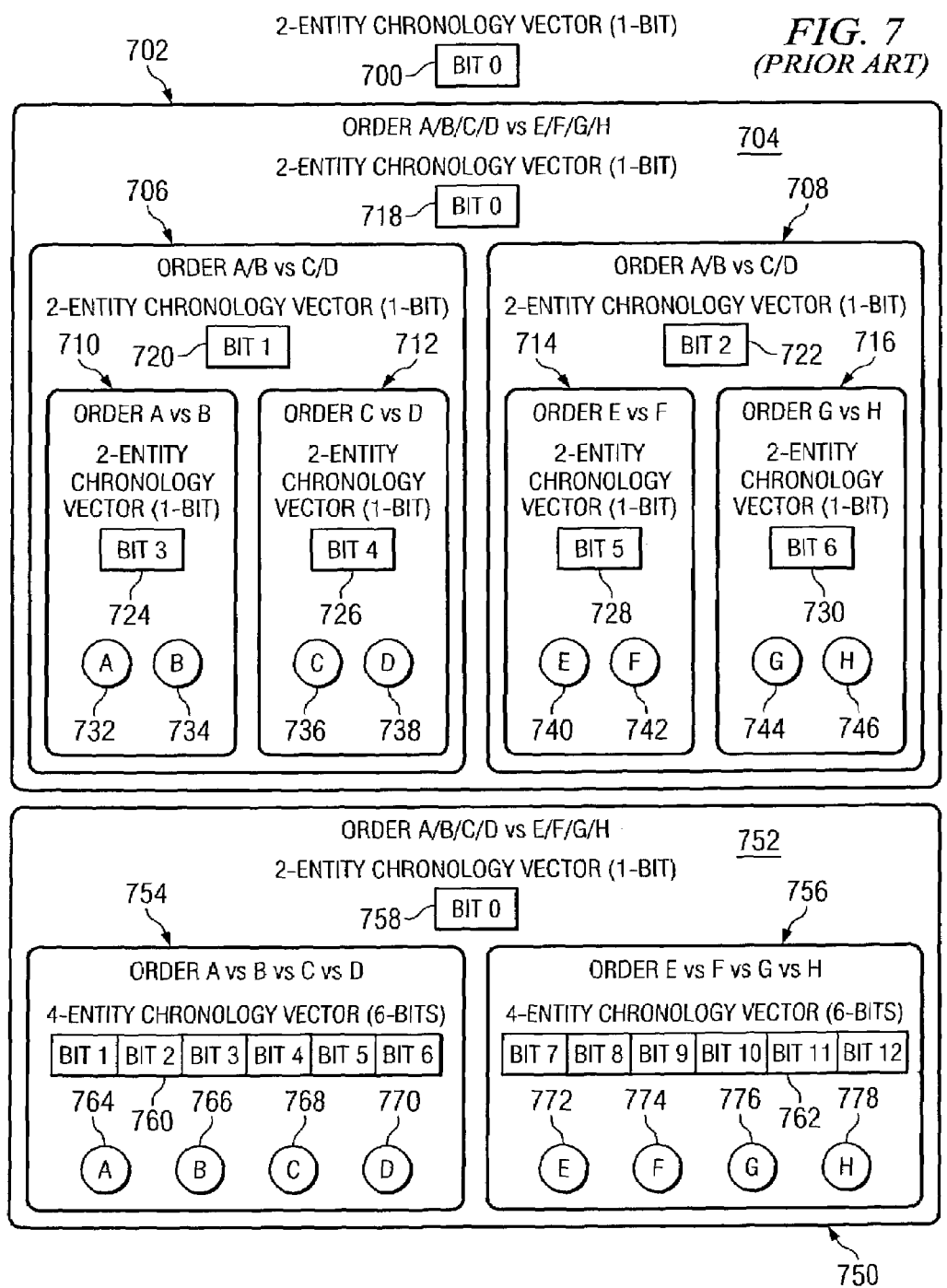
FIG. 7 is a diagram of example tree based LRU structures.

In another example, still referring to FIG. 7, a combination of 2-entity and 4-entity vectors are used to construct a different tree-based LRU scheme, as illustrated by tree structure 750 for an 8-way associative cache. In this example, tree structure 750 includes nodes 752, 754, and 756. Node 752 includes one bit chronology vector 758, while node 754 contains six bit chronology vector 760, and node 756 contains six bit chronology vector 762. These vectors are used to point to member positions A 764, B 766, C 768, D 770, E 772, F 774, G 776, and H 778.

Figure 8:
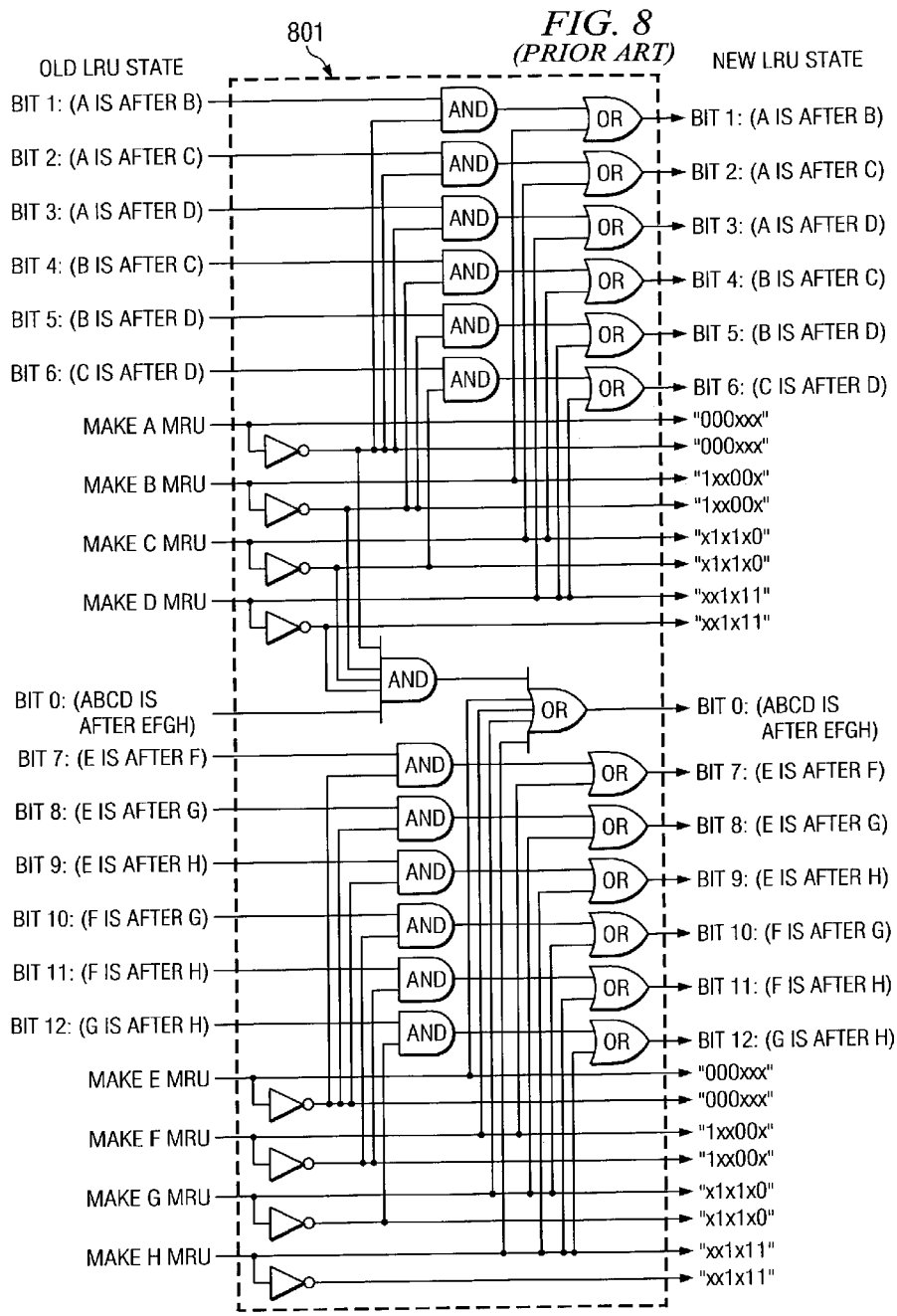
FIG. 8 is a circuit diagram of an MRU-update function.

Referring now to FIG. 8, a circuit diagram 801 illustrates the combination of varying size chronology vectors with a tree-based scheme embodied in an MRU-update function for the tree structure 750 shown in FIG. 7.

Figure 9A:
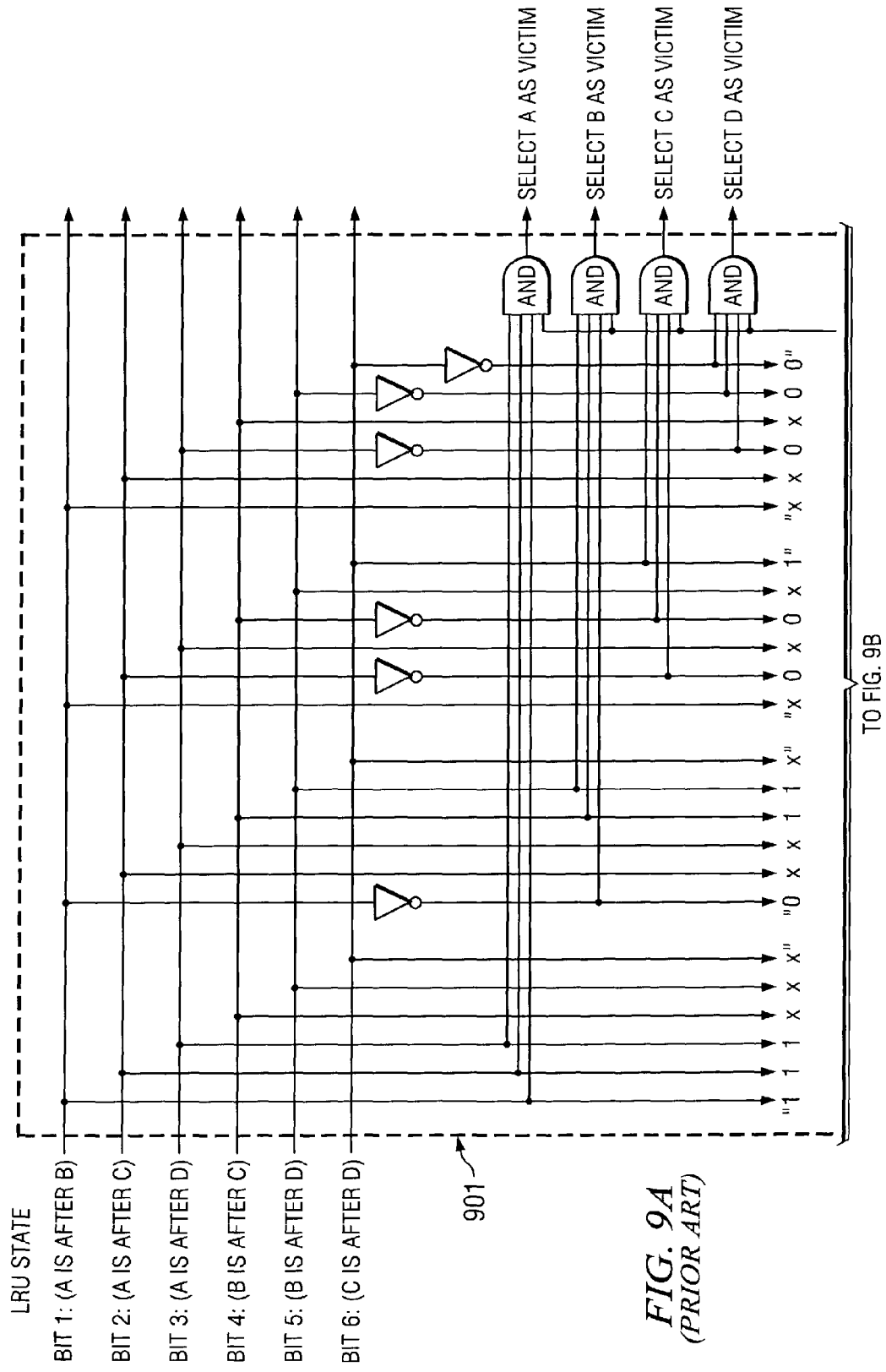
FIGS. 9A–9B are a circuit diagram of an LRU victim selection function.
Figure 9B:
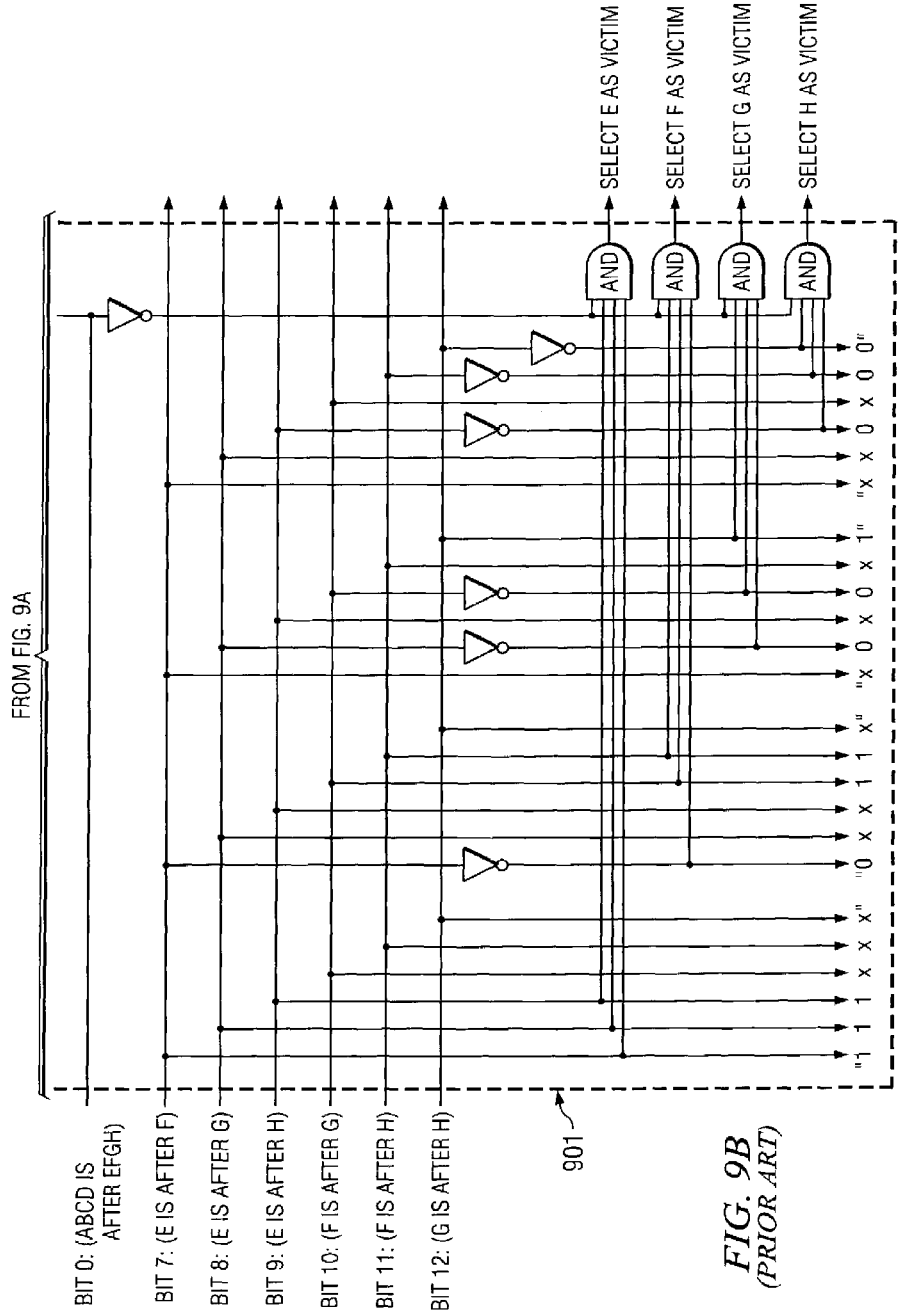

Referring now to FIGS. 9A–9B, a circuit diagram 901 illustrates the combination of varying size chronology vectors with a tree-based scheme embodied in an LRU victim selection function for the LRU tree 750 shown in FIG. 7.

Often, favorable operating characteristics and reduced complexity implementations for a cache can be achieved when the victim selection and state update portions of a cache allocation policy are tightly integrated with a common pipeline for accessing the cache arrays, directory arrays, and allocation policy (e.g. LRU) state arrays.

Further, in such implementations, further benefits are typically derived when the victim selection occurs as early as possible in the common pipeline, and when for each operational use of the pipeline, at most one cache allocation policy state update is performed.

Figure 10:
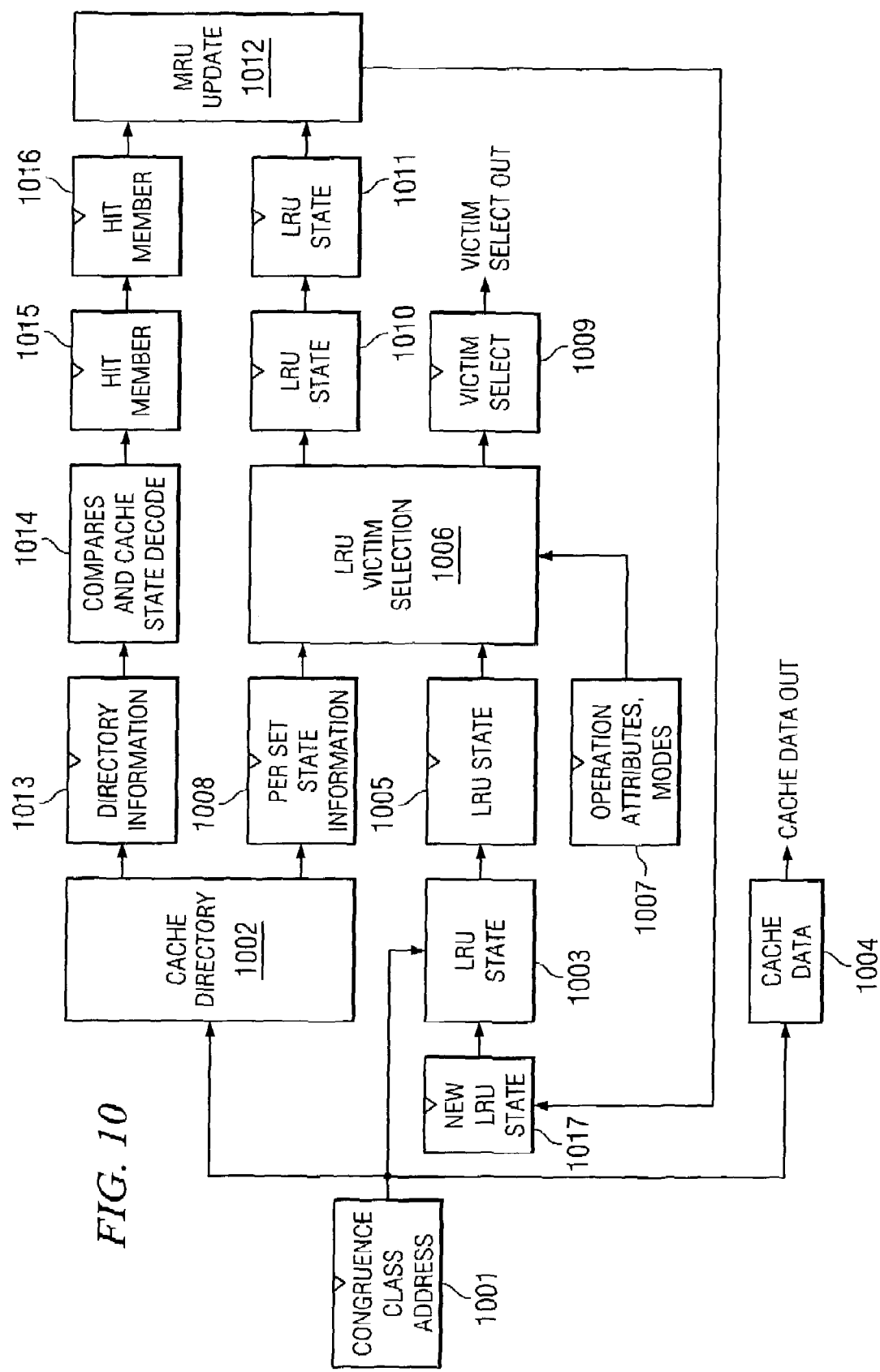
FIG. 10 is a diagram of a known cache architecture.

Referring now to FIG. 10, a cache architecture is illustrated. The cache congruence class index (or address) is held in latch 1001. From there, the address is simultaneously routed to the directory array 1002, the LRU state array 1003, and, for operations which speculatively read the cache, to the data array 1004.

From LRU state array 1003, the state information for the accessed congruence class is read and deposited into latch 1005. The state bits 0 through 12 of LRU tree 750, found in FIG. 7 are an example of such state information.

From staging latch 1005, the LRU state information is routed to least recently used (LRU) victim selection logic 1006, which is comprised largely of LRU victim selection logic such as that shown in circuit diagram 901, found in FIGS. 9A–9B. This logic always chooses a potential victim, whether one is needed or not. The selected victim member position is deposited in latch 1009. If selected victim was not needed, the LRU state will not be changed accordingly. This function will be described with the MRU update logic.

In addition to speculatively selecting a victim, victim selection logic 1006 also passes along some or all of the LRU state information to MRU update logic 1012, via pipelined latches 1010 and 1011. For implementations which cannot selectively write some bits to a given entry in LRU state array 1003, while leaving other bits in that entry unchanged, latches 1010 and 1011 must convey all the LRU state information (since all bits will be written when the array is updated). For implementations which can selectively write some bits to an entry in array 1003, while leaving other bits in that entry unchanged, latches 1010 and 1011 need only an indication of which member was selected as a victim.

As indicated above, LRU victim selection logic 1006 may be augmented by partitioning a congruence class into multiple subclasses and restricting allocation to one or more subclasses, often based upon the attributes (e.g., instruction access, data access, which processor/thread) of the operation accessing the cache, or based upon mode switches.

A subset of the attributes of an operation and/or static mode switch settings are placed in latch 1007. From there, it is routed to LRU victim select logic 1006, which may be augmented by a set of operational modes and possibly by one or more congruence class partitioning policies.

Referring once again to FIG. 10, least-recently-used victim selection logic 1006 may also be augmented by an invalid member select override policy. The invalid member select override policy makes use of cache member state information typically found in the cache directory 1002. A subset of the coherency state information (e.g., the valid bit) for all the members in the congruence class (indexed by 1001) is read from directory 1002 and placed in latch 1008. From there, it is routed to the LRU victim select logic 1006, which may be augmented by an invalid member select override policy.

Referring once again to FIG. 10, MRU update logic 1012 receives a pipelined indication of which member was speculatively selected as a potential victim from staging latch 1011. Meanwhile, the contents of the associated congruence class lookup in the directory 1002 were latched in latch 1013 and routed to the compare and decode logic 1014.

The compare and decode logic 1014 determines whether the operation is a cache hit, and if so, which member in the congruence class is the hit member. This logic also determines whether or not the operation must be aborted due to a collision with a protected resource, or due to a permission conflict between the operation type and the coherence state of the cache line.

The "hit member" information indicates one of the following: no operation occurred (either there was no operation at that time or the operation was aborted), a cache miss occurred, or a cache hit occurred against a given member position. The "hit member" information is deposited into latch 1015, and pipelined forward to latch 1016, from which it is routed to the MRU update logic 1012.

In the MRU update logic 1012, the following information is collected for a given operation: whether or not an operation occurred (from latch 1016); if the operation occurred, whether the operation was a hit or miss (from latch 1016); if the operating was a hit, which member position contained the cache line that was hit (from latch 1016); if the operation was a miss, which member position was chosen to allocate the new cache line (from latch 1011).

If no operation occurred, the LRU state will remain unchanged. If a hit operation occurred, the LRU state will be updated such that the hit member position is established as MRU. If a miss operation occurred, the LRU state will be updated such that the allocated member position is established as MRU. Circuit diagram 801 in FIG. 8 shows an example implementation of this MRU update function.

The updated LRU state information is deposited in latch 1017, poised for writeback into LRU state array 1003. For implementations which cannot selectively write some bits to a given entry in the LRU state array 1003, while leaving other bits in that entry unchanged, latch 1017 holds the entire contents of the entry to be written into the array. This latch must convey all the LRU state information (since all bits will be written when the array is updated). For implementations which can selectively write some bits to an entry in array 1003, while leaving other bits in that entry unchanged, latch 1017 consists of a write enable mask (indicating which bits of the entry will be written), as well as a vector of update bit values (for bits that will be written according to the mask).

An objective of the present invention is to address the behavioral problems in a system with an inclusive second level cache, shared amongst multiple types of cache line (e.g., instructions and data) which are exhibited when the "unbalanced" nature of an application would otherwise result in the displacement of a specific type (e.g., instructions) of cache line from the second level cache, and thereby from the first level cache.

Another objective of the present invention is to address the problems in a manner such that the solution does not introduce undesirable behavioral side effects (e.g., due to the static partitioning of congruence classes) which are exhibited in "balanced" applications.

Yet an additional objective of the present invention is to choose victims from non-protected member positions in a fair and repeatable manner, not subject to behavioral differences due to the member position of a protected member.

It is also an objective of the present invention to operate in a self-contained manner, i.e., not requiring any external information to indicate the characteristics of a given application.

It is also an objective of the present invention to facilitate an efficient circuit implementation characterized by low latency and low circuit count, yielding value as characterized in the description of FIGS. 9A–9B.

It is also an objective of the present invention to introduce no new requirements that logic be introduced to detect and/or correct random bit errors that may occur in LRU state.

The present invention achieves its stated and other objectives by incorporating one member in each congruence class that is set apart from the typical LRU-based victim selection logic as a special substitute victim member. Of the remaining members, one and only one member at any given time may be chosen from any of the remaining members (i.e., those members subject to the rule of LRU-based victim selection, and thus ordered by a tree of chronology vectors) as a special elected member.

That elected member has a special status (e.g., by virtue of belonging to a "favored" type of operation, such as instruction). This status is indicated by an election pointer to that member, which pointer is stored in the LRU state array as an extension beyond the tree of chronology vectors already stored there.

When a cache miss occurs and a victim member must be selected, the victim select logic, in accordance with the prior art, chooses the least-recently-used (or least worthy) member for victimization. If an elected member (whose elected status is not revoked by the current operation) is found to be the least worthy member and to be deserving of victimization, the substitute member is victimized in the stead of the elected member, and when the MRU update occurs for the new cache line allocated to the substitute member position, the MRU worthiness is imputed (or credited) back to the unworthy elected member by diverting the MRU update to that member indicated by the election pointer.

When a cache hit occurs for any members other than the substitute victim member, the MRU worthiness of the hit member is updated in accordance with the prior art, including the case in which the hit member is the elected member. When a cache hit occurs for the substitute victim member, the MRU worthiness of the substitute victim member is imputed (or credited) back to the unworthy elected member by diverting the MRU update to that member indicated by the election pointer.

In general, the objective is to protect cache lines associated with favored operations when the caching behavior is unbalanced, but to minimize the effects of the bias when caching behavior is balanced. The minimization of the bias during balanced scenarios is achieved by limiting the numbered of elected members, and by employing a fair and balanced LRU scheme amongst non-elected members. The protection of favored cache lines during unbalanced scenarios is accomplished by saving the elected, favored, fair victim due to the substitution of the substitute victim and by imputing the worthiness of the substitute victim to the elected member.

Figure 11:
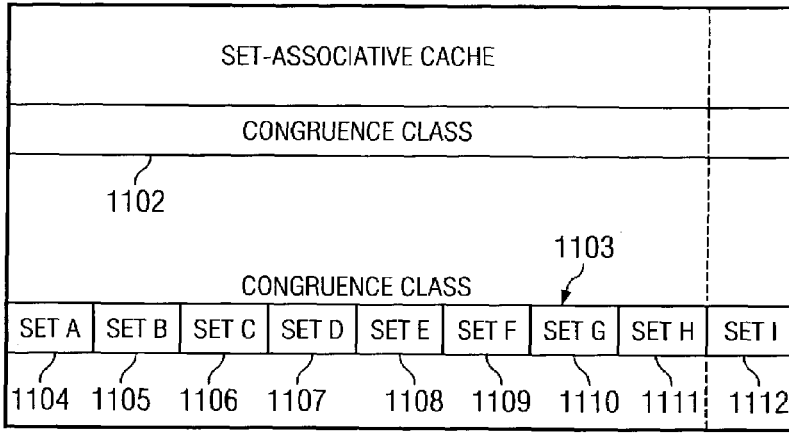
FIG. 11 is a diagram of a cache, such as the one shown in FIG. 6, enlarged to a 9-way associative cache in accordance with a preferred embodiment of the present invention.

Referring now to FIG. 11, the cache shown in FIG. 6 is enlarged to become a 9-way associative cache 1101. The cache is comprised of multiple congruence classes 1102, 1103, which are typically selected by a subset of the address of the cache line being referenced. Each congruence class is comprised of nine members A 1104, B 1105, C 1106, D 1107, E 1108, F 1109, G 1110, H 1111, and I 1112. Member I 1112 is the substitute victim member.

Figure 12:
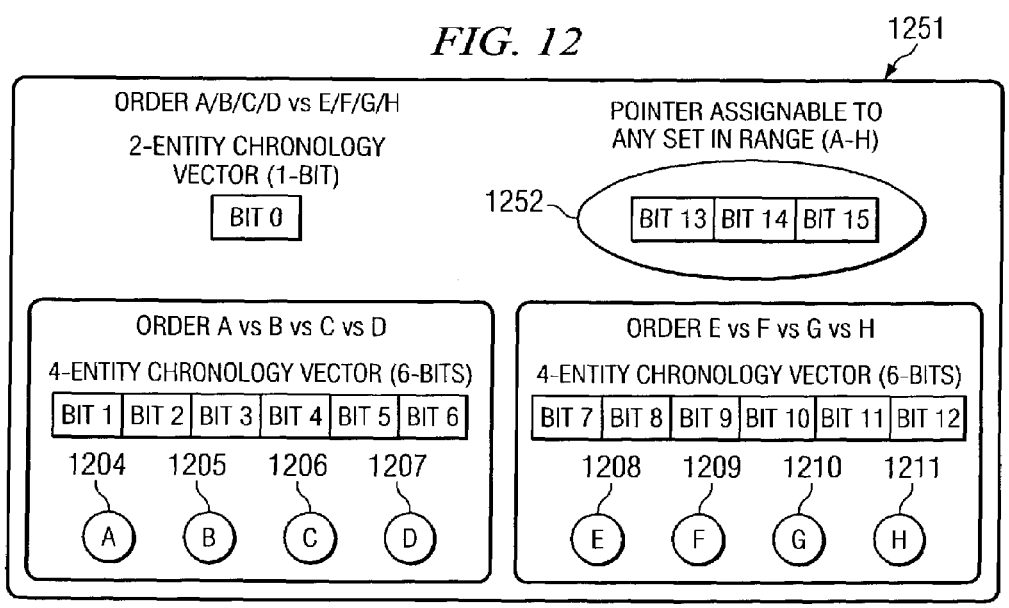
FIG. 12 is a diagram of a LRU tree shown in FIG. 7 augmented with an additional 3-bit election pointer in accordance with a preferred embodiment of the present invention.

Referring now to FIG. 12, the LRU tree 750 shown in FIG. 7 is augmented to show the same tree organization 1251, with an additional 3-bit election pointer 1252. The election pointer can be set to point to any of the eight members A 1204, B 1205, C 1206, D 1207, E 1208, F 1209, G 1210, or H 1211. It should be noted here that while having a NULL value (i.e., not pointing to any member) as an initial value is conceptually simple, and is actually implemented at no cost for caches whose LRU schemes order a non-power-of-two number of members, the absence of a NULL encoding does not diminish the value of the present embodiment. For the present embodiment, assume the election pointer initially selects member A 1204.

Figure 13:
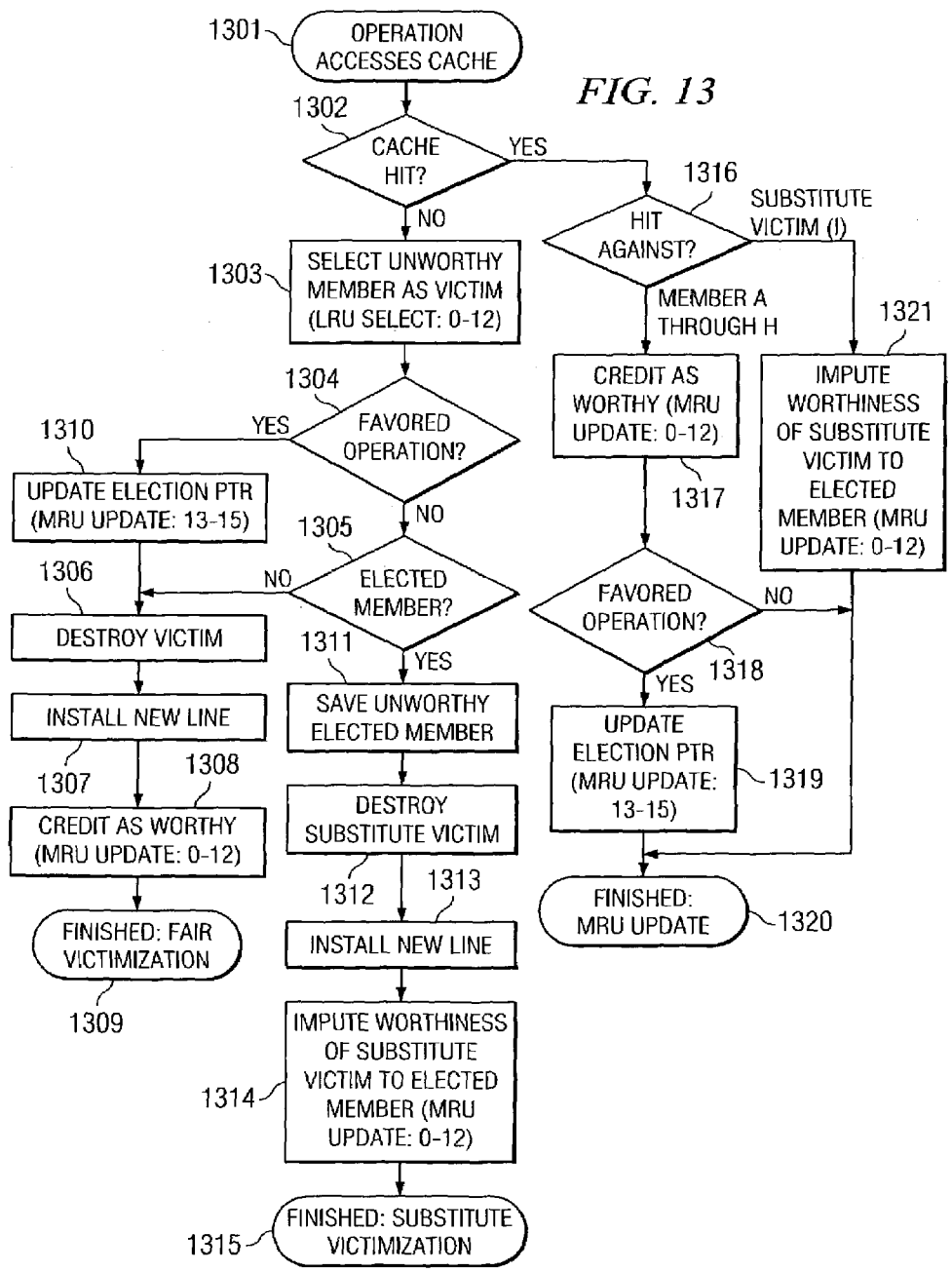
FIG. 13 is a flowchart of a process for selecting victims from members, including a substitute victim, in accordance with a preferred embodiment of the present invention.

Referring now to FIG. 13, a flow diagram illustrates the behavior in accordance with a preferred embodiment of the present invention. In general, the flow has one starting point 1301, corresponding to the introduction of an operation to the cache, and three ending points.

One ending point, ending point 1309, corresponds to the case in which a cache miss results in the fair victimization of a non-elected member, or in the fair victimization of a previously elected member whose election is voided due to a transfer of elected status to the current operation.

A second ending point, ending point 1315, corresponds to the case in which a cache miss results in the saving of an unworthy, elected member due to the victimization of the substitute member in its stead, and in its being credited with the worthiness of the newly allocated cache line in the substitute member position.

A third ending point, ending point 1320, corresponds to the case in which a cache hit results in worthiness being credited to the hit member for the current operation, or being credited to the elected member if the hit member for the current operation is the substitute victim member.

Following the first path, from step 1301 to step 1309, an operation accesses the cache in step 1301. If the operation misses the cache, step 1302 directs the operation to step 1303, during which the LRU victim select logic consults LRU bits 0–12 from FIG. 11 to choose a fair victim from member positions A through H, i.e., A 1104, B 1105, C 1106, D 1107, E 1108, F 1109, G 1110, or H 1111 from FIG. 11.

Next, step 1304 determines whether or not the current operation is a favored operation, i.e., whether or not the current operation will supplant the current elected member to become the new elected member. In the present embodiment, any instruction fetch operation is a favored operation, however, favored operation status could be determined based upon any number of conceivable static or dynamic selection algorithms.

If the operation is favored (as determined in step 1304), step 1310 updates the election pointer (held in LRU bits 13–15 from FIG. 13) such that it points to the fair victim position chosen in step 1303. This is the position into which the cache line requested by the current operation will be placed. Note that the election pointer may have already been pointing to this position. Next, control passes to step 1306.

If the operation is not favored (as determined in step 1304), step 1305 compares the election pointer to the fair victim chosen in step 1303. If no match is present, i.e., the fair victim has not been elected, control passes to step 1306.

In step 1306, whether an operation has arrived because an unworthy member lost its election, or because the unworthy member was not elected in the first place, the consequence is the same: the victimization of the unworthy cache line held in that member position.

Next, in step 1307, the new cache line fetched by the operation is installed into the fairly victimized member position. In step 1308, an MRU update (to LRU bits 0–12 from FIG. 12) occurs for the newly installed cache line, crediting as worthy its member position. Step 1309 indicates the completion of this case.

Following the second path, from step 1301 to step 1315, an operation accesses the cache in step 1301. If the operation misses the cache, step 1302 directs the operation to step 1303, during which the LRU victim select logic consults LRU bits 0–12 from FIG. 12 to choose a fair victim from member positions A through H, i.e., A 1104, B 1105, C 1106, D 1107, E 1108, F 1109, G 1110, or H 1111 from FIG. 11.

Next, step 1304 determines whether or not the current operation is a favored operation, i.e., whether or not the current operation will supplant the current elected member to become the new elected member. In the present embodiment, any instruction fetch operation is a favored operation, however, favored operation status could be determined based upon any number of conceivable static or dynamic selection algorithms.

If the operation is not favored (as determined in step 1304), step 1305 compares the election pointer to the fair victim chosen in step 1303. If there is a match, i.e., the fair victim has been elected, control passes to step 1311.

In step 1311, the substitute victim member is substituted for the elected (but unworthy) fair victim selection, saving the elected, unworthy, fair victim selection from victimization.

Next, in step 1312, the cache line in the substitute victim member position is victimized in the stead of the unworthy fair victim, due to its election. In step 1313, the new cache line fetched by the operation is installed into the substitute victim member position. In step 1314, an MRU update (to LRU bits 0–12 from FIG. 12) is imputed by the substitute victim member to the elected member (by means of the election pointer), crediting the unworthy elected member as worthy. Step 1315 indicates the completion of this case.

Following the third path, from 1301 to 1320, an operation accesses the cache in step 1301. If the operation hits in the cache, step 1302 directs the operation to step 1316, which determines whether or not the operation hit against the substitute victim member position.

If the operation did not hit against the substitute victim member position, step 1317 performs an MRU update (to LRU bits 0–12 from FIG. 12) against the hit member, crediting its worthiness for retention in the cache. Next, step 1318 determines whether or not the current operation is a favored operation. If not, step 1320 indicates the completion of this case. If so, step 1319 updates the election pointer (held in LRU bits 13–15 from FIG. 12) such that it points to the hit member position. Note that the election pointer may have already been pointing to this position. Next, step 1320 indicates the completion of this case.

If the operation did hit against the substitute victim member position, step 1321 performs an MRU update (to LRU bits 0–12 from FIG. 12) to impute the worthiness of the substitute victim member to the elected member (by means of the election pointer), crediting the elected member as worthy. Step 1320 indicates the completion of this case.

Figure 14:
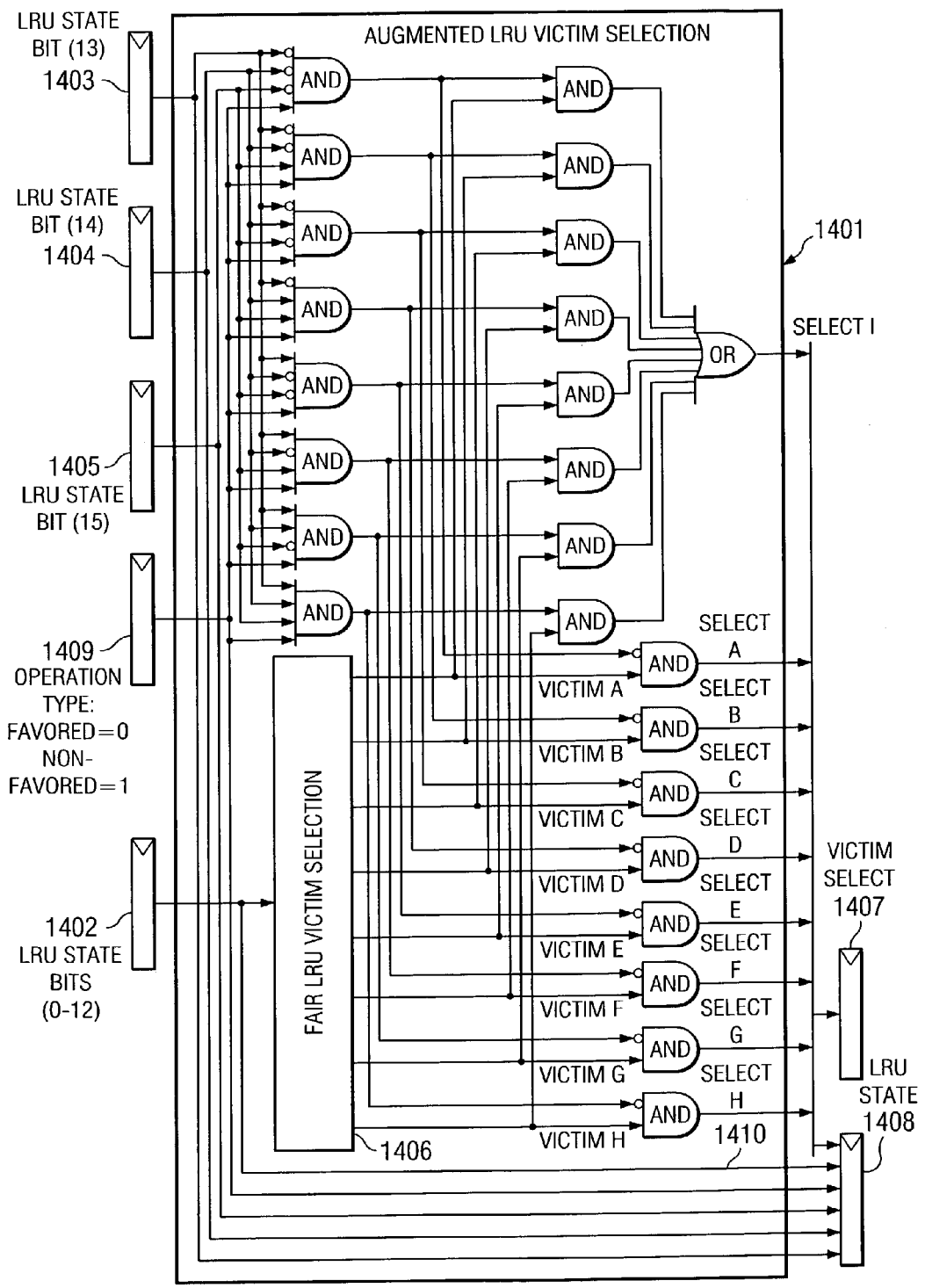
FIG. 14 is a circuit diagram illustrating how the LRU victim selection function shown in FIGS. 9A–9B is extended in accordance with a preferred embodiment of the present invention.

Referring now to FIG. 14, a circuit diagram 1401 illustrates how the LRU victim selection function shown in FIGS. 9A–9B is extended in accordance with a preferred embodiment of the present invention. The LRU state bits (0–12) which comprise the LRU tree 1251 in FIG. 12 are driven from latch 1402. This latch corresponds to latch 1005 in FIG. 10 into fair LRU victim select logic 1406, which corresponds to circuit diagram 901 in FIGS. 9A–9B. The LRU state bits (13–15) which form election pointer 1252 in FIG. 12 are driven from latches 1403, 1404, and 1405, which correspond to latch 1005 in FIG. 10. Operation type 1409 indicates whether the operation is favored (indicated by a zero value) or non-favored (indicated by a one value), and corresponds to latch 1007 in FIG. 10. Path 1410 exists only for implementations in which the LRU state information must be pipelined forward for the LRU array writeback. Victim select latch 1407 corresponds to latch 1009 in FIG. 10. LRU state latch 1408 corresponds to latch 1010 in FIG. 10.

Another objective of the present invention is to enhance the innovations of the present invention taught with respect to selection of a single substitute victim to address the behavioral problems in a system with an inclusive second level cache, shared amongst multiple types of cache line (e.g., instructions and data), which are exhibited when the "unbalanced" nature of an application would otherwise result in the displacement of two specific types (e.g., processor 0 instructions and processor 1 instructions) of cache line from the second level cache, and thereby from the first level caches.

One mechanism of the present invention teaches how to protect against the displacement of one type of cache line, while another mechanism of the present invention teaches how to protect against the displacement of two types of cache lines.

In these examples, the protection is extended to two types of cache lines by adding a second substitute victim member, by adding a second election pointer to indicate which member position is protected by that second substitute victim member, and by adding a toggle bit which is used to resolve critical conflict scenarios which can arise when a single cache line in a single member position satisfies the membership criteria for both protected types, and hence becomes doubly protected.

In general, one objective is to protect cache lines associated with favored operations when the caching behavior is unbalanced, but to minimize the effects of that bias when caching behavior is balanced. The minimization of the bias during balanced scenarios is achieved by limiting the number of elected members and by employing a fair and balanced LRU scheme amongst non-elected members. The protection of favored cache lines during unbalanced scenarios is accomplished by saving the elected, favored, fair victim due to the substitution of the substitute victim and by imputing the worthiness of the substitute victim to the elected member.

Given that the goal of protecting elected members is valid only to the extent that the system is exhibiting unbalanced cache behavior and given that unbalanced caching behavior is characterized by a small fraction of second level cache accesses resulting from favored operations, the mechanism of the present invention does not waste resources in order to protect elected members in all scenarios. Rather, it focuses on providing protection for likely scenarios with a minimum of resources, while allowing protection of elected members to slip in scenarios which are by definition unlikely to occur when the system exhibits unbalanced caching behavior.

In light of this, note that with two types of favored status, two norms of behavior exist. In one norm, the elected cache lines for both occupy different member positions in a congruence class, neither of which would have been likely to be allocated to one of the two substitute victim member positions. For this norm, each elected member position would be fully protected by a substitute victim member position dedicated to that favored type of operation.

In the other norm, a single elected cache line might be favored by both, hence occupying only one, doubly-elected member position. For this norm, the one elected member position would be fully protected by one or the other of the substitute victim member positions.

For this other norm, any transition back to the first norm would be triggered due to a cache access by one of the favored types of operation, which cache access did not hit against the existing doubly elected member position. If the access hit against a different non-substitute member position, the transition back to the first norm would occur. If the doubly elected member was not the least recently used member, even a miss would trigger a transition back to the first norm. However, in the case of a miss by a favored operation, when the doubly elected member is the LRU member, the favored operation can be allocated to a substitute victim member position.

Having an elected cache line reside in a substitute victim member position introduces a set of problems, which are addressed by the introduction of a toggle bit to the LRU state information for each congruence class. The toggle bit is used to facilitate two additional long term favored member protection configurations in these examples.

The standard configuration, extended from the invention as described with respect to a single substitute victim, allows for two (or one) protected member positions to reside anywhere amongst the non-substitute victim member positions, with both substitute victim positions being used to absorb non-favored allocations.

One new configuration, which is active when both election pointers doubly elect the same member position, and when the toggle bit is reset to zero, allows for two protected member positions, one residing anywhere amongst the non-substitute victim member positions, and the other residing in the first substitute victim member position, with the second substitute being used to absorb non-favored allocations.

The other new configuration, which is active when both election pointers doubly elect the same member position and when the toggle bit is set to one, allows for two protected member positions. One position resides anywhere amongst the non-substitute victim member positions and the other position resides in the second substitute victim member position, with the first substitute being used to absorb non-favored allocations.

The nature of the transitions amongst these configurations is described in more detail in FIGS. 17, 18, 19, and 20.

Figure 15:
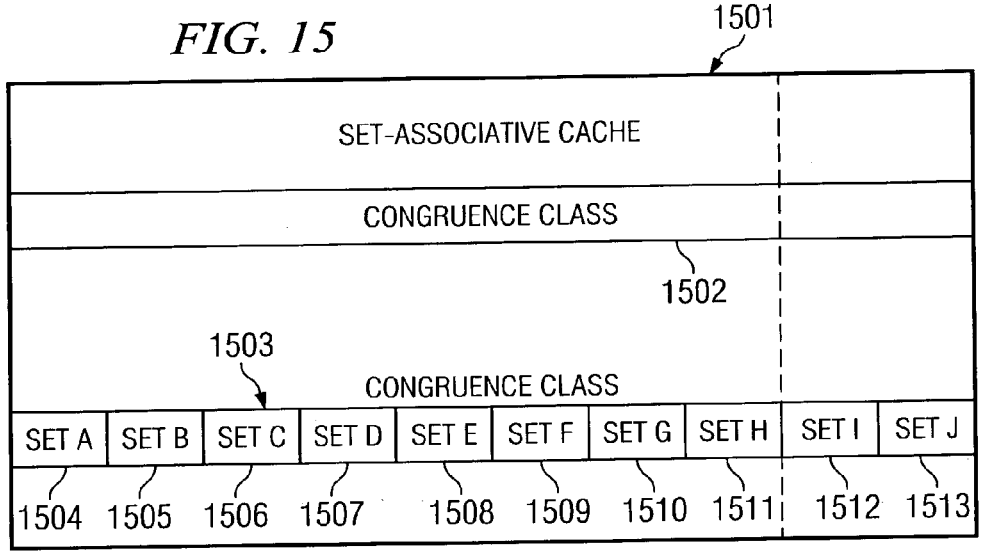
FIG. 15 is a diagram of the cache shown in FIG. 11 in which the cache is enlarged to become a 10-way associative cache in accordance with a preferred embodiment of the present invention.

Referring now to FIG. 15, the cache shown in FIG. 11 is enlarged to become a 10-way associative cache 1501. The cache is comprised of multiple congruence classes 1502 and 1503, which are typically selected by a subset of the address of the cache line being referenced. Each congruence class is comprised of nine members A 1504, B 1505, C 1506, D 1507, E 1508, F 1509, G 1510, H 1511, I 1512, and J 1513. Member I 1512 is the first substitute victim member. Member J 1513 is the second substitute victim member.

Figure 16:
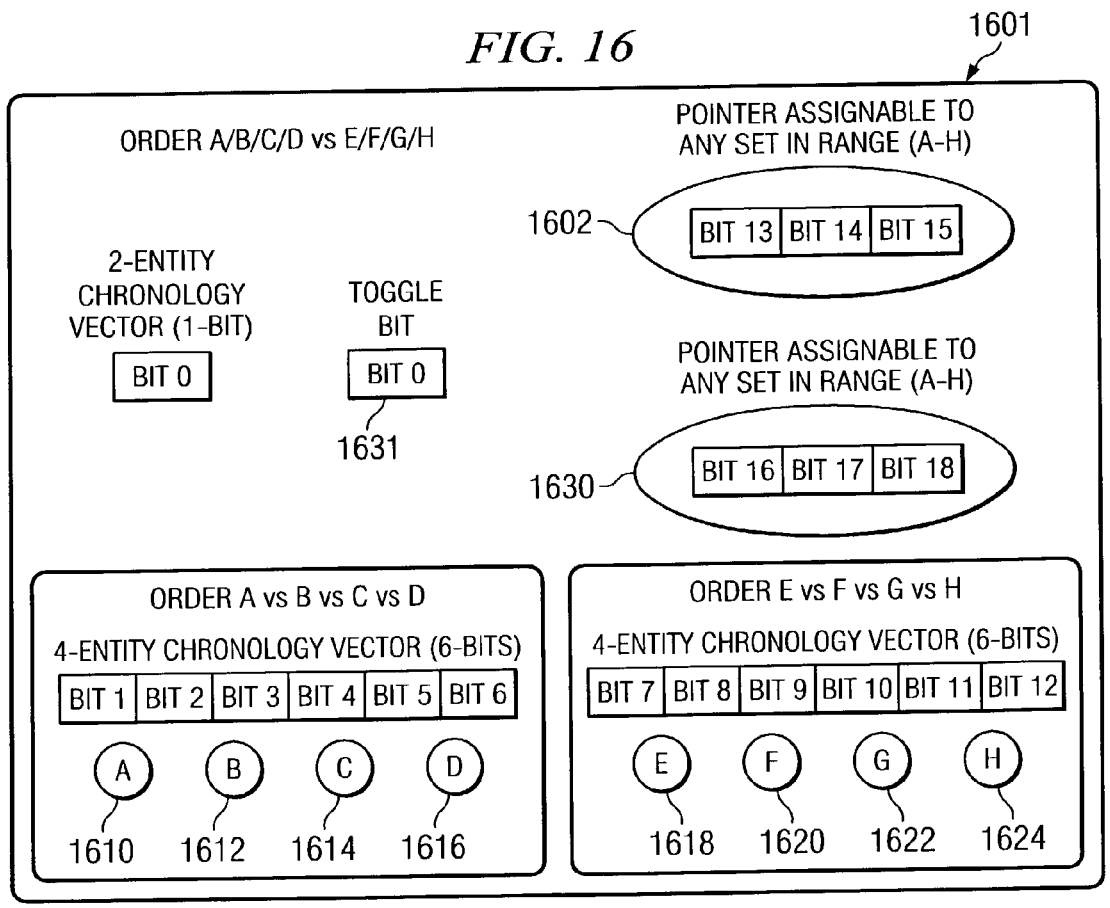
FIG. 16 is a diagram of the LRU tree shown in FIG. 12, augmented to show the same tree organization, with a first 3-bit election pointer, and a second 3-bit election pointer in accordance with a preferred embodiment of the present invention.

Referring now to FIG. 16, the LRU tree 1251 shown in FIG. 12 is augmented to show the same tree organization 1601, with a first 3-bit election pointer 1602, called Elector X, and a second 3-bit election pointer 1630, called Elector Y. Either election pointer can be set to point to any of the eight members A 1610, B 1612, C 1614, D 1616, E 1618, F 1620, G 1622, or H 1624. It should be noted here that while having a NULL value (i.e., not pointing to any member) as an initial value is conceptually simple and is actually implemented at no cost for caches whose LRU schemes order a non-power-of-two number of members, the absence of a NULL encoding does not diminish the value of the present embodiment. For the present embodiment, assume both election pointers initially select member A 1610. FIG. 16 also shows the toggle bit 1631, which is used to resolve conflict scenarios described later.

Referring now to FIGS. 17, 18, 19, and 20, flow diagrams illustrate the behavior in accordance with a preferred embodiment of the present invention. In general, the flow has one starting point 1701, corresponding to the introduction of an operation to the cache, and multiple ending points.

Figure 17B:
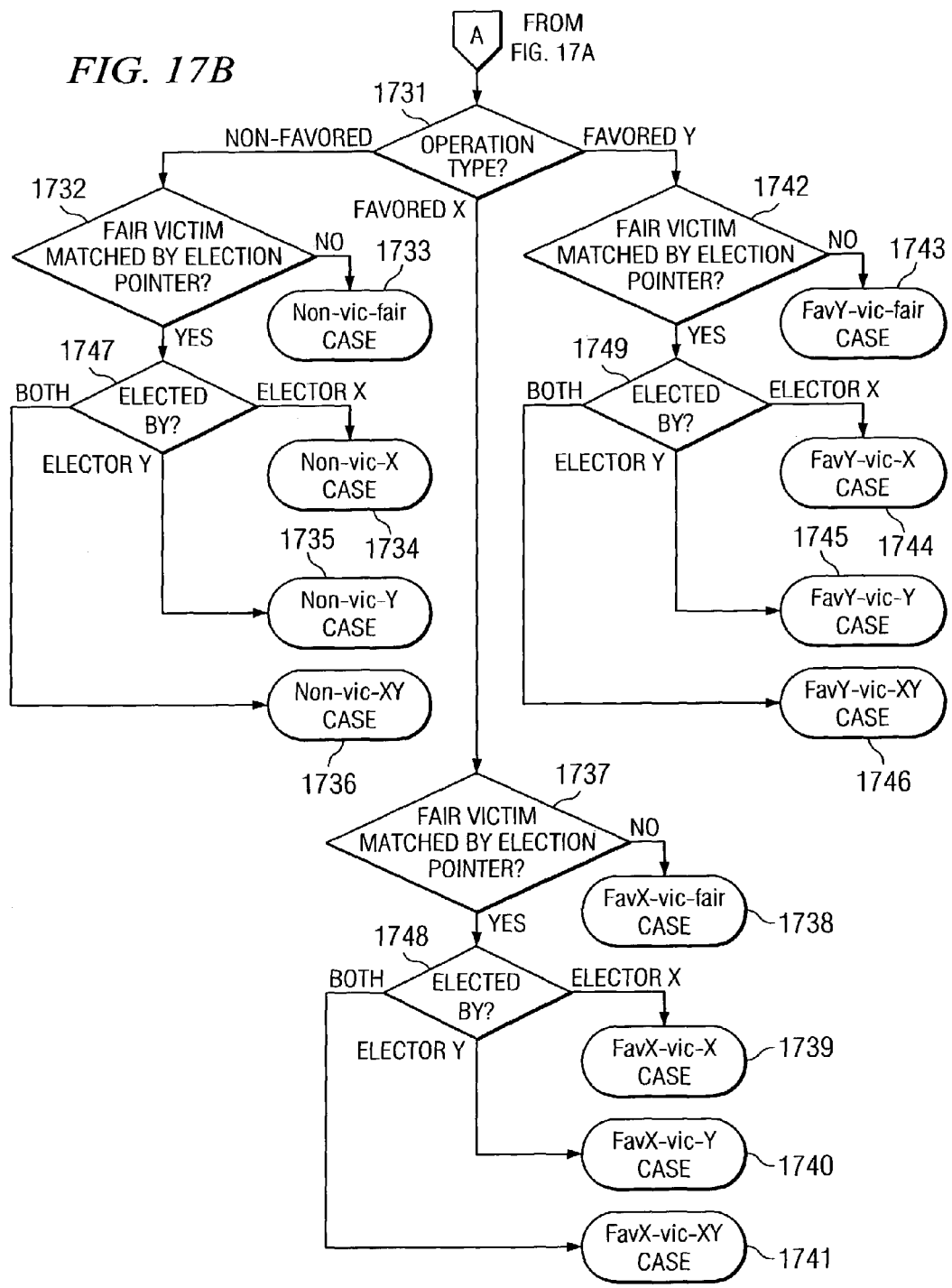

Referring now to FIGS. 17A–17B, an operation accesses cache 1701. If the operation hits in the cache, step 1702 directs the operation to step 1703, which determines whether the current operation is of the first type of favored operations (Favored X), or if the second type of favored operations (Favored Y), or a non-favored operation.

If step 1703 determines that the current operation is of the non-favored type, then step 1704 determines whether the operation hit against the first substitute victim member position (member I), or the second substitute victim member position (member J), or against a normal member position (members A through H).

Figure 18:
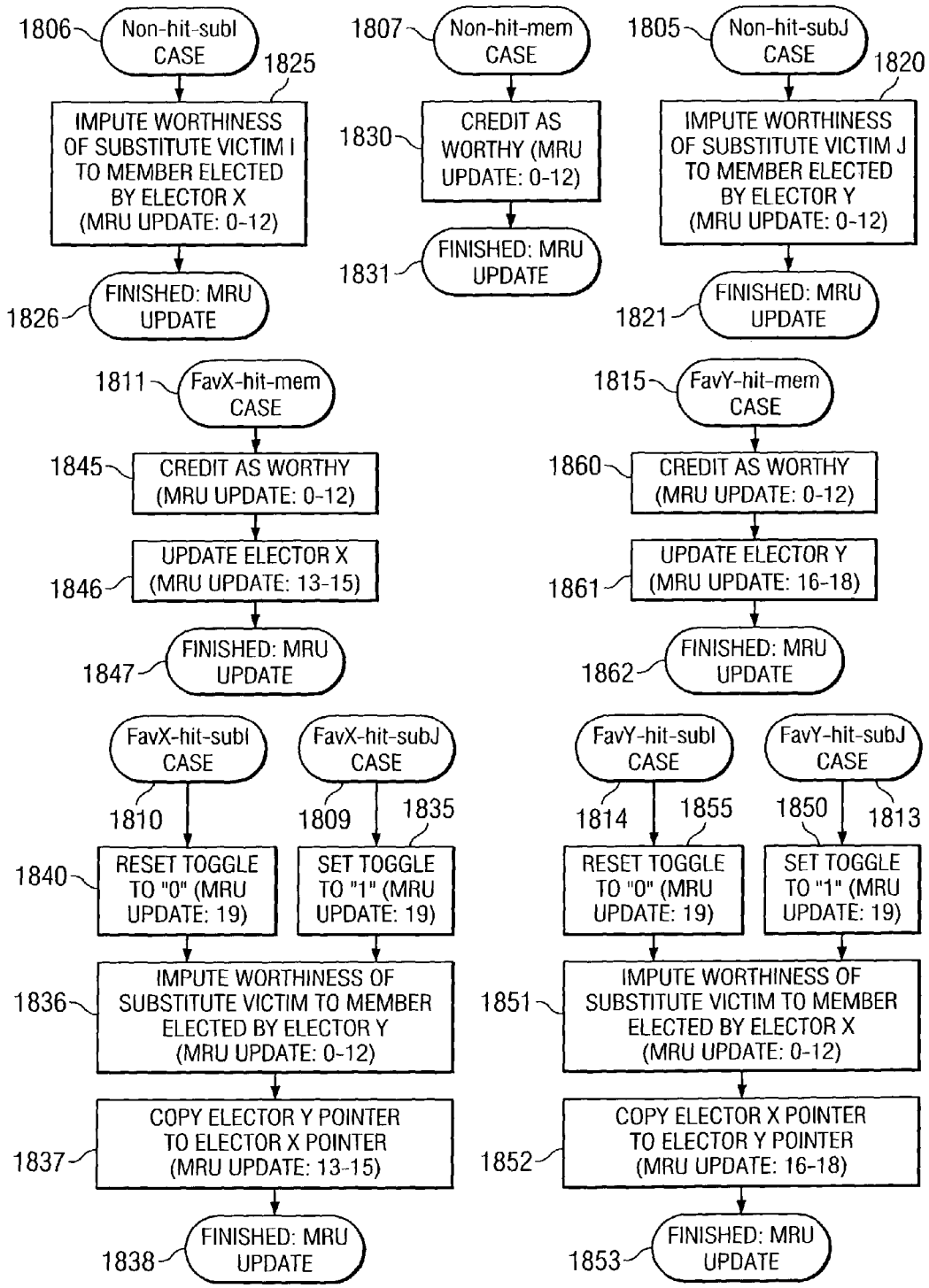
FIG. 18 is a diagram of processes used to provide a most recently used update in accordance with a preferred embodiment of the present invention.

If step 1704 determines that a non-favored operation hit against a normal member (A through H), control passes through step 1707 to step 1807 in FIG. 18. Referring now to FIG. 18, control passes from step 1807 to step 1830. Step 1830 performs an MRU update (to LRU bits 0–12 from FIG. 16) against the hit member, crediting its worthiness for retention in the cache. Step 1831 indicates the completion of this case. Note that this case behaves consistently with the art prior to the present invention.

Referring back to FIGS. 17A–17B, if step 1704 determines that a non-favored operation hit against the first substitute victim member position (member I), control passes through step 1706 to step 1806 in FIG. 18. Referring now to FIG. 18, control passes from step 1806 to step 1825. Step 1825 performs an MRU update (to LRU bits 0–12 from FIG. 16) to impute the worthiness of the first substitute victim member to the elected member (by means of election pointer Elector X), crediting the elected member as worthy. Step 1826 indicates the completion of this case. Note that this case behaves consistently with the single election pointer as described above for the present invention with respect to a single substitute victim.

Referring back to FIGS. 17A–17B, if step 1704 determines that a non-favored operation hit against the second substitute victim member position (member J), control passes through step 1705 to step 1805 in FIG. 18. Referring now to FIG. 18, control passes from step 1805 to step 1820. Step 1820 performs an MRU update (to LRU bits 0–12 from FIG. 16) to impute the worthiness of the second substitute victim member to the elected member (by means of election pointer Elector Y), crediting the elected member as worthy. Step 1821 indicates the completion of this case. Note that this case relies on the addition of a second substitute member as described above Referring back to FIGS. 17A–17B, if step 1703 determines that the current operation is of the first type of favored operations (Favored X), then step 1708 determines whether the operation hit against the first substitute victim member position (member I), or the second substitute victim member position (member J), or against a normal member position (members A through H).

If step 1708 determines that a first type of favored operation (Favored X) hit against a normal member (A through H), control passes through step 1711 to step 1811 in FIG. 18. Referring now to FIG. 18, control passes from step 1811 to step 1845. Step 1845 performs an MRU update (to LRU bits 0–12 from FIG. 16) against the hit member, crediting its worthiness for retention in the cache. Step 1846 updates the election pointer Elector X (held in LRU bits 13–15 from FIG. 16) such that this pointer points to the hit member position. Note that the election pointer may have already been pointing to this position. Step 1847 indicates the completion of this case. Note that this case behaves consistently with the mechanism of the present invention as described for a single substitute.

Referring back to FIGS. 17A–17B, if step 1708 determines that a first type of favored operation (Favored X) hit against the first substitute victim member position (member I), control passes through step 1710 to step 1810 in FIG. 18. Referring now to FIG. 18, control passes from step 1810 to step 1840. Step 1840 resets the toggle bit (LRU bit 19 from FIG. 16) to a "zero" value to protect member position I (described below). Next, step 1836 performs an MRU update (to LRU bits 0–12 from FIG. 16) to impute an extra measure of worthiness to the elected member corresponding to the second victim member (by means of election pointer Elector Y), crediting the elected member as worthy. Next, step 1837 sets the election pointer Elector X (LRU bits 13–15 from FIG. 16) to point to the same member position as election pointer Elector Y, thereby causing both pointers to protect the same doubly elected member position. Step 1838 indicates the completion of this case.

In this manner, the first substitute victim member positions itself becomes a protected position. This situation is caused by making both election pointers equal to each other and by setting the toggle bit to a "zero" value. As described in subsequent victim selection cases, equal election pointers are used to protect a substitute victim member position specified by the toggle bit with a "zero" value in the toggle bit protecting the first substitute victim member position (member I) when the election pointers are equal and with a "one" value in the toggle bit protecting the second substitute victim member position (member J) when the election pointers are equal. Also, with this approach, the member position indicated by both election pointers is doubly protected, providing for a second protected member position.

Therefore, in this particular case, once step 1838 is reached, member I (normally the first substitute victim member position), contains the cache line favored as the first type of favored operation, and the member position (within A through H) to which both election pointers point, contains the cache line favored as the second type of favored operation.

Note that this case resolves difficulties which can arise if a member position becomes doubly protected for a time (i.e., operations of both favored types hit against the same member position, thereby resulting in both election pointers pointing to the same member position). Once double protection occurs, a subsequent operation of one the favored types that misses the cache could lead to the allocation of a cache line that needs to be protected into one of the substitute victim member positions. Therefore, it is important to be able to protect a cache line in one of the substitute victim member positions. The combination of equalizing the election pointers with using the toggle bit to indicate which substitute is protected, satisfies this need. Note that this case relies on novel features beyond those taught with respect to a single substitute victim.

Referring back to FIGS. 17A–17B, if step 1708 determines that a first type of favored operation (Favored X) hit against the second substitute victim member position (member J), control passes through step 1709 to step 1809 in FIG. 18. Referring now to FIG. 18, control passes from step 1809 to step 1835. Step 1835 sets the toggle bit (LRU bit 19 from FIG. 16) to a "one" value to protect member position J. Next, step 1836 performs an MRU update (to LRU bits 0–12 from FIG. 16) to impute an extra measure of worthiness to the elected member corresponding to the second victim member (by means of election pointer Elector Y), crediting the elected member as worthy. Thereafter, step 1837 sets the election pointer Elector X (LRU bits 13–15 from FIG. 16) to point to the same member position as election pointer Elector Y, thereby causing both pointers to protect the same doubly elected member position. Step 1838 indicates the completion of this case. Note that this case relies on novel features beyond those taught with respect to a single substitute victim.

Referring back to FIGS. 17A–17B, if step 1703 determines that the current operation is of the second type of favored operations (Favored Y), then step 1712 determines whether the operation hit against the first substitute victim member position (member I), or the second substitute victim member position (member J), or against a normal member position (members A through H).

If step 1712 determines that a second type of favored operation (Favored Y) hit against a normal member (A through H), control passes through step 1715 to step 1815 in FIG. 18. Referring now to FIG. 18, control passes from step 1815 to step 1860. Step 1860 performs an MRU update (to LRU bits 0–12 from FIG. 16) against the hit member, crediting its worthiness for retention in the cache. Step 1861 updates the election pointer Elector Y (held in LRU bits 16–18 from FIG. 16) such that it points to the hit member position. Note that the election pointer may have already been pointing to this position. Step 1862 indicates the completion of this case. Note that this case relies on the addition of a second type of favored operation, and a second election pointer to the mechanism of the present invention as described for use with a single substitute victim.

Referring back to FIGS. 17A–17B, if step 1712 determines that a second type of favored operation (Favored Y) hit against the first substitute victim member position (member I), control passes through step 1714 to step 1814 in FIG. 18. Referring now to FIG. 18, control passes from step 1814 to step 1855. Step 1855 resets the toggle bit (LRU bit 19 from FIG. 16) to a "zero" value to protect member position I. Next, step 1851 performs an MRU update (to LRU bits 0–12 from FIG. 16) to impute an extra measure of worthiness to the elected member corresponding to the first victim member (by means of election pointer Elector X), crediting the elected member as worthy. Next, step 1852 sets the election pointer Elector Y (LRU bits 16–18 from FIG. 16) to point to the same member position as election pointer Elector X, thereby causing both pointers to protect the same doubly elected member position. Step 1853 indicates the completion of this case. Note that this case relies on novel features beyond those taught with respect to the mechanism of the present invention for a single substitute victim.

Referring back to FIGS. 17A–17B, if step 1712 determines that a second type of favored operation (Favored Y) hit against the second substitute victim member position (member J), control passes through step 1713 to step 1813 in FIG. 18. Referring now to FIG. 18, control passes from step 1813 to step 1850. Step 1850 sets the toggle bit (LRU bit 19 from FIG. 16) to a "one" value to protect member position J. Next, step 1851 performs an MRU update (to LRU bits 0–12 from FIG. 16) to impute an extra measure of worthiness to the elected member corresponding to the first victim member (by means of election pointer Elector X), crediting the elected member as worthy. Next, step 1852 sets the election pointer Elector Y (LRU bits 16–18 from FIG. 16) to point to the same member position as election pointer Elector X, thereby causing both pointers to protect the same doubly elected member position. Step 1853 indicates the completion of this case. Note that this case relies on novel features beyond those taught with respect to the mechanism of the present invention for a single substitute victim.

Referring once again to FIGS. 17A–17B, if an operation misses in the cache, step 1702 directs the operation to step 1730, during which the LRU victim select logic consults LRU bits 0–12 from FIG. 16 to choose a fair victim from member positions A through H, i.e., A 1610, B 1612, C 1614, D 1616, E 1618, F 1620, G 1622, or H 1624 from FIG. 16.

Next, step 1731 determines whether the current operation is of the first type of favored operations (Favored X), or if the second type of favored operations (Favored Y), or a non-favored operation.

If step 1731 determines that the current operation is of the non-favored type, then step 1732 determines whether the fair victim member position chosen in step 1730 matches either of the election pointers (Elector X or Elector Y). If there is a match, step 1747 determines whether the fair victim matches Elector X, Elector Y, or both.

If step 1732 determines that a non-favored operation missed the cache and that the fairly chosen victim member was not elected by either election pointer, control passes through step 1733 to step 1933 in FIG. 19. Referring now to FIG. 19, control passes from step 1933 to step 1950. In step 1950, the fairly chosen unworthy victim cache line is evicted from the cache. Next, in step 1951, the new cache line fetched by the operation is installed into the fairly victimized member position. In step 1952, an MRU update (to LRU bits 0–12 from FIG. 16) occurs for the newly installed cache line, crediting as worthy its member position. Step 1953 indicates the completion of this case. Note that this case behaves consistently with the art prior the present invention with respect to a single substitute victim.

Referring back to FIGS. 17A–17B, if step 1747 determines that a non-favored operation missed the cache and that the fairly chosen victim member was elected by Elector X, control passes through step 1734 to step 1934 in FIG. 19. Referring now to FIG. 19, control passes from step 1934 to step 1965. In step 1965, the first substitute victim member is substituted for the elected (but unworthy) fair victim selection, saving the elected, unworthy, fair victim member from victimization. In step 1966, the cache line in the first substitute victim member position (member I) is victimized in place of the unworthy fair victim, due to its election. Next, in step 1967, the new cache line fetched by the operation is installed into the first substitute victim member position. In step 1968, an MRU update (to LRU bits 0–12 from FIG. 16) is imputed by the first substitute victim member to the elected member (by means of the election pointer), crediting the unworthy elected member as worthy. Step 1969 indicates the completion of this case. Note that this case behaves consistently with the present invention taught with respect to a single substitute victim.

Referring back to FIGS. 17A–17B, if step 1747 determines that a non-favored operation missed the cache and that the fairly chosen victim member was elected by Elector Y, control passes through step 1735 to step 1935 in FIG. 19. Referring now to FIG. 19, control passes from step 1935 to step 1970. In step 1970, the second substitute victim member is substituted for the elected (but unworthy) fair victim selection, saving the elected, unworthy, fair victim member from victimization. In step 1971, the cache line in the second substitute victim member position (member J) is victimized in the stead of the unworthy fair victim, due to its election.

Next, in step 1972, the new cache line fetched by the operation is installed into the second substitute victim member position. In step 1973, an MRU update (to LRU bits 0–12 from FIG. 16) is imputed by the second substitute victim member to the elected member (by means of the election pointer), crediting the unworthy elected member as worthy. Step 1974 indicates the completion of this case. Note that this case relies on the addition of a second substitute victim member and a second elector pointer to the invention taught with respect to a single substitute victim according to the present invention.

Referring back to FIGS. 17A–17B, if step 1747 determines that a non-favored operation missed the cache and that the fairly chosen victim member was elected by both election pointers, control passes through step 1736 to step 1936 in FIG. 19. As noted earlier, when both election pointers point to the same member, one of the substitute victim member positions is protected and the other is designated for substitute victimization. The value of the toggle bit indicates which one is protected. Referring now to FIG. 19, control passes from step 1936 to step 1975. In step 1975 the doubly elected (but unworthy) fair victim is saved from victimization, since it is doubly elected.

In step 1976, the toggle value is queried to determine whether the first or second substitute victim member will be victimized in the stead of the doubly elected fair victim. If the toggle value is "zero", the first substitute victim member (member I) is protected, and control passes to step 1971, which was described earlier, and which victimizes the second substitute victim member. If the toggle value is "one", the second substitute victim member (member J) is protected, and control passes to step 1966, which was described earlier, and which victimizes the first substitute victim member. Note that this case relies on novel features beyond those taught with respect to a single substitute victim as described above in the present invention.

Referring once again to FIGS. 17A–17B, if step 1731 determines that the current operation is of the first type of favored operations (Favored X), then step 1737 determines whether the fair victim member position chosen in step 1730 matches either of the election pointers (Elector X or Elector Y). If there is a match, step 1748 determines whether the fair victim matches Elector X, Elector Y, or both.

If step 1737 determines that a first type of favored operation (Favored X) missed the cache and that the fairly chosen victim member was not elected by either election pointer, control passes through step 1738 to step 1938 in FIG. 19. Referring now to FIG. 19, control passes from step 1938 to step 1955. In step 1955, the fairly chosen unworthy victim cache line is evicted from the cache. Next, in step 1956, the new cache line fetched by the operation is installed into the fairly victimized member position. In step 1957, an MRU update (to LRU bits 0–12 from FIG. 16) occurs for the newly installed cache line, crediting as worthy its member position. Step 1958 updates the election pointer Elector X (held in LRU bits 13–15 from FIG. 16) such that it points to the allocated member position. Step 1959 indicates the completion of this case. Note that this case behaves consistently with the present invention described with respect to a single substitute victim.

Figure 20A:
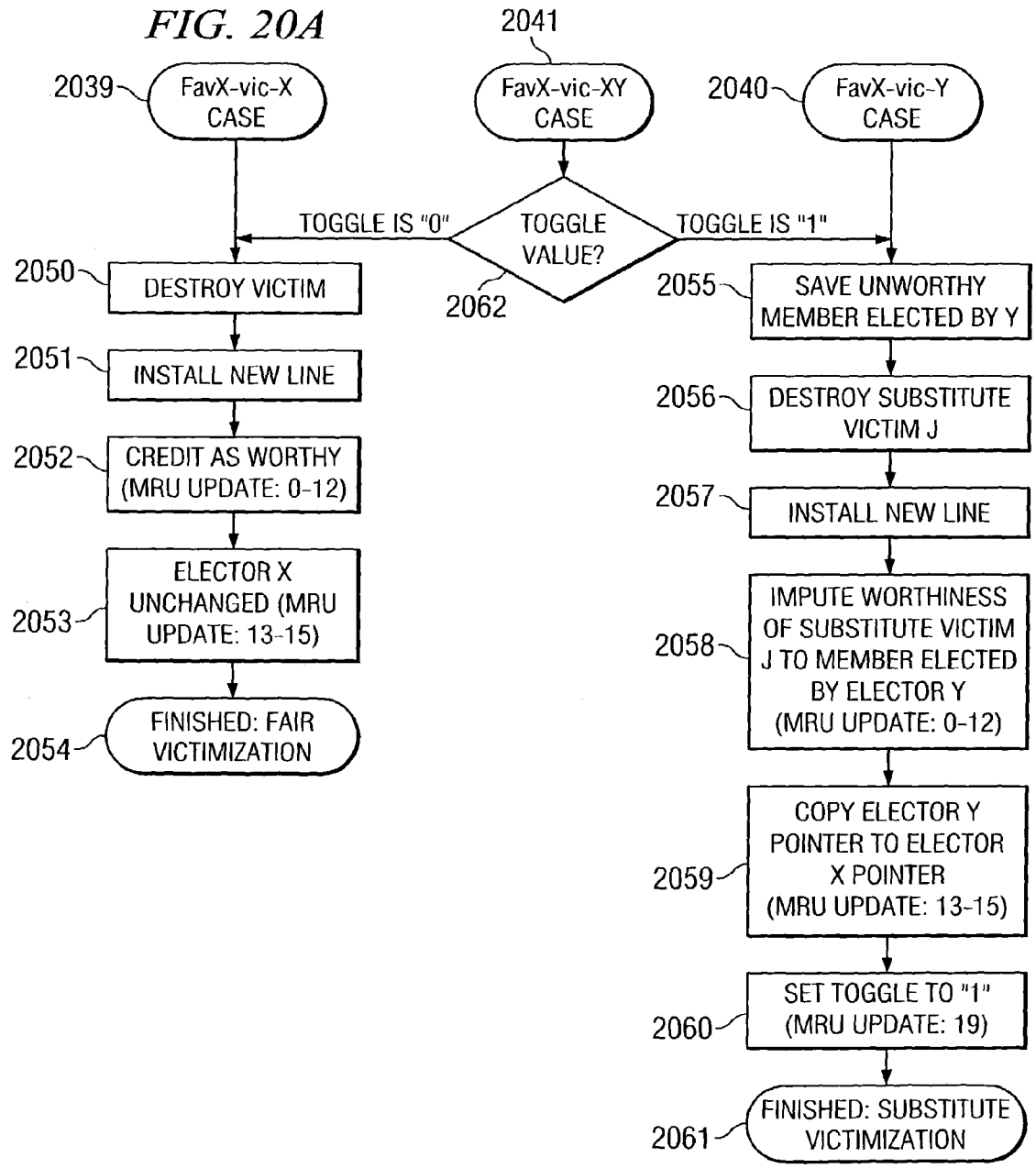
FIGS. 20A–20B are a diagram of processes used to select a victim in which an election pointer is employed in the selection process in accordance with a preferred embodiment of the present invention.
Figure 20B:
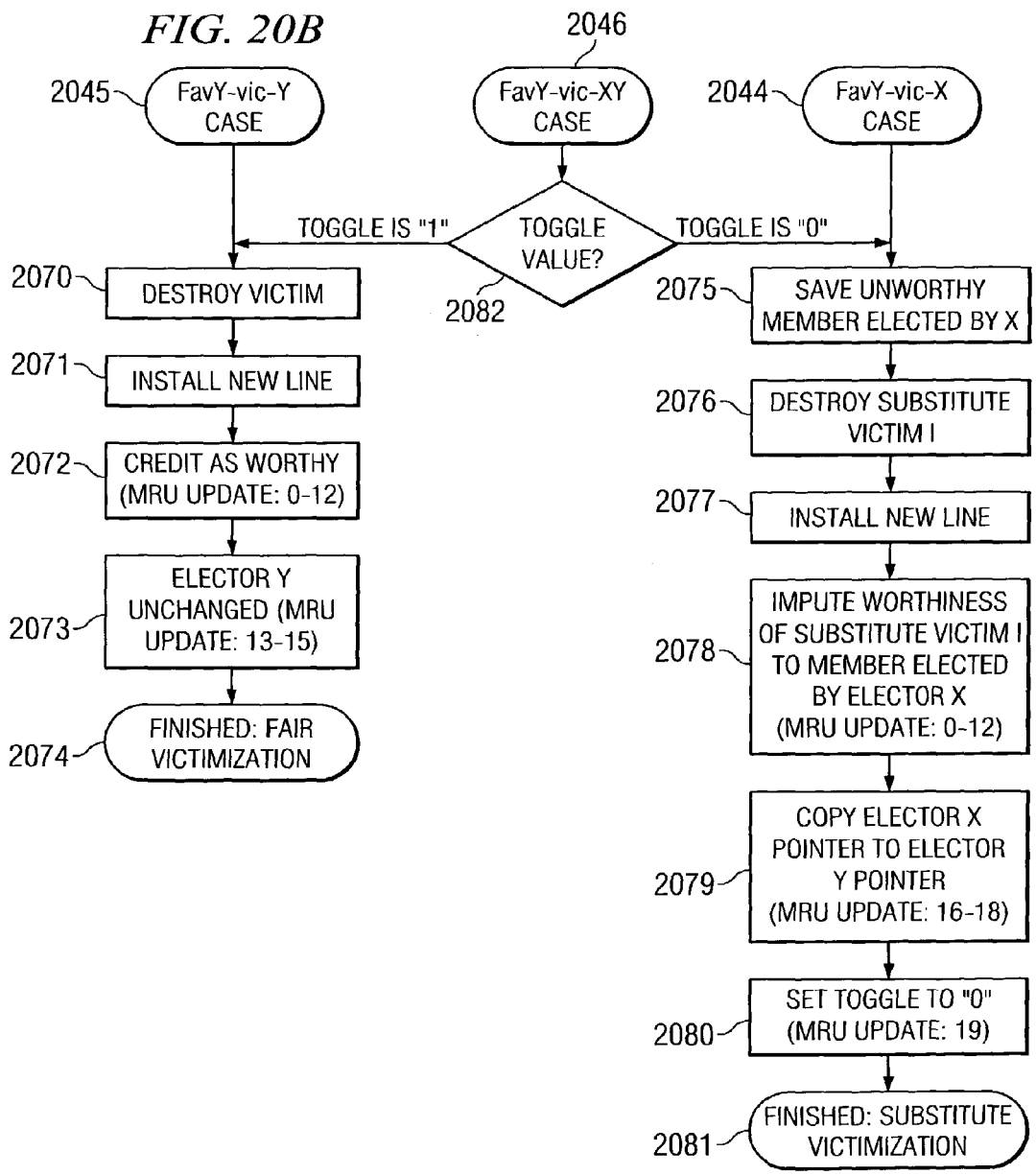

Referring back to FIGS. 17A–17B, if step 1748 determines that a first type of favored operation (Favored X) missed the cache and that the fairly chosen victim member was elected by the first election pointer (Elector X), control passes through step 1739 to step 2039 in FIGS. 20A–20B. Referring now to FIGS. 20A–20B, control passes from step 2039 to step 2050, in step 2050 the fairly chosen unworthy victim cache line is evicted from the cache, since it loses its elected status to the current operation. Next, in step 2051, the new cache line fetched by the operation is installed into the fairly victimized member position. In step 2052, an MRU update (to LRU bits 0–12 from FIG. 16) occurs for the newly installed cache line, crediting as worthy its member position. Step 2053 leaves the election pointer Elector X (held in LRU bits 13–15 from FIG. 16) unchanged, such that it still points to the allocated member position. Step 2054 indicates the completion of this case. Note that this case behaves consistently with the present invention with respect to a single substitute victim.

Referring back to FIGS. 17A–17B, if step 1748 determines that a first type of favored operation (Favored X) missed the cache and that the fairly chosen victim member was elected by the second election pointer (Elector Y), control passes through step 1740 to step 2040 in FIGS. 20A–20B. Referring now to FIGS. 20A–20B, control passes from step 2040 to step 2055. In step 2055, the second substitute victim member (member J) is substituted for the elected, unworthy, fair victim member, saving the elected member from victimization. In step 2056, the cache line in the second substitute victim member position (member J) is victimized in the stead of the unworthy fair victim, due to its election. Next, in step 2057, the new cache line fetched by the operation is installed into the second substitute victim member position. In step 2058, an MRU update (to LRU bits 0–12 from FIG. 16) is imputed by the second substitute victim member to the elected member (by means of the election pointer), crediting the unworthy elected member as worthy.

Next, since the second substitute victim member position now contains the new first favored type of cache line, it must be protected. As indicated earlier, this is accomplished by making both election pointers equal to each other and setting the toggle bit to indicate which substitute victim member position should be protected.

Step 2059 sets the election pointer Elector X (LRU bits 13–15 from FIG. 16) to point to the same member position as election pointer Elector Y, thereby causing both pointers to protect the same doubly elected member position, which holds the second favored type of cache line. Step 2060 sets the toggle bit (LRU bit 19 from FIG. 16) to a "one" value, thereby protecting the new first favored type of cache line held in the second substitute victim member position. Step 2061 indicates the completion of this case. Note that this case relies on novel features beyond those taught in the present invention with respect to a single substitute victim.

Referring back to FIGS. 17A–17B, if step 1748 determines that a first type of favored operation (Favored X) missed the cache and that the fairly chosen victim member was elected by both election pointers (Elector X and Elector Y), control passes through step 1741 to step 2041 in FIGS. 20A–20B. As noted earlier, when both election pointers point to the same member, one of the substitute victim member positions is protected and the other is designated for substitute victimization. The value of the toggle bit indicates which one is protected.

Referring now to FIGS. 20A–20B, control passes from step 2041 to step 2062. In step 2062, the toggle value is queried to determine which member will be victimized. Note that in this particular case, which is unlikely to occur in unbalanced caching scenarios, there is a 50% chance that the doubly elected member is victimized instead of a substitute victim member position. The immediate protection goals are superceded by the goal of establishing a stable toggle configuration.

If the toggle value is "zero", the goal of the toggle configuration is to place (Favored X) cache lines into the doubly elected member, (Favored Y) cache lines into the first substitute victim member, and non-favored cache lines into the second substitute victim member. Therefore, if the toggle value is "zero", since the current operation is a (Favored X) operation, control passes to step 2050, which was described earlier, and which victimizes the doubly elected member even though it may contain a (Favored Y) cache line.

If the toggle value is "one", the goal of the toggle configuration is to place (Favored Y) cache lines into the doubly elected member, (Favored X) cache lines into the second substitute victim member, and non-favored cache lines into the first substitute victim member. Therefore, if the toggle value is "one", since the current operation is a (Favored X) operation, control passes to step 2055, which was described earlier, and which victimizes the second substitute victim member.

Note that this case relies on novel features beyond those taught in by the present invention with respect to a single substitute victim.

Referring once again to FIGS. 17A–17B, if step 1731 determines that the current operation is of the second type of favored operations (Favored Y), then step 1742 determines whether the fair victim member position chosen in step 1730 matches either of the election pointers (Elector X or Elector Y). If there is a match, step 1749 determines whether the fair victim matches Elector X, Elector Y, or both.

If step 1742 determines that a second type of favored operation (Favored Y) missed the cache and that the fairly chosen victim member was not elected by either election pointer, control passes through step 1743 to step 1943 in FIG. 19. Referring now to FIG. 19, control passes from step 1943 to step 1960. In step 1960 the fairly chosen unworthy victim cache line is evicted from the cache. Next, in step 1961, the new cache line fetched by the operation is installed into the fairly victimized member position. In step 1962, an MRU update (to LRU bits 0–12 from FIG. 16) occurs for the newly installed cache line, crediting as worthy its member position. Step 1963 updates the election pointer Elector Y (held in LRU bits 16–18 from FIG. 16) such that it points to the allocated member position. Step 1964 indicates the completion of this case. Note that this case relies on the addition of a second substitute victim member and a second elector pointer to the art by the present invention with respect to a single substitute victim.

Referring back to FIGS. 17A–17B, if step 1749 determines that a second type of favored operation (Favored Y) missed the cache and that the fairly chosen victim member was elected by the second election pointer (Elector Y), control passes through step 1745 to step 2045 in FIGS. 20A–20B. Referring now to FIGS. 20A–20B, control passes from step 2045 to step 2070. In step 2070, the fairly chosen unworthy victim cache line is evicted from the cache, since it loses its elected status to the current operation. Next, in step 2071, the new cache line fetched by the operation is installed into the fairly victimized member position. In step 2072, an MRU update (to LRU bits 0–12 from FIG. 16) occurs for the newly installed cache line, crediting as worthy its member position. Step 2073 leaves the election pointer Elector Y (held in LRU bits 16–18 from FIG. 16) unchanged, such that it still points to the allocated member position. Step 2074 indicates the completion of this case.

Note that this case relies on the addition of a second substitute victim member and a second elector pointer to the mechanism of the present invention described with respect to the use of a single substitute victim.

Referring back to FIGS. 17A–17B, if step 1749 determines that a second type of favored operation (Favored Y) missed the cache and that the fairly chosen victim member was elected by the first election pointer (Elector X), control passes through step 1744 to step 2044 in FIGS. 20A–20B. Referring now to FIGS. 20A–20B, control passes from step 2044 to step 2075. In step 2075, the first substitute victim member (member I) is substituted for the elected, unworthy, fair victim member, saving the elected member from victimization. In step 2076, the cache line in the first substitute victim member position (member I) is victimized instead of the unworthy fair victim, due to its election. Next, in step 2077, the new cache line fetched by the operation is installed into the first substitute victim member position. In step 2078, an MRU update (to LRU bits 0–12 from FIG. 16) is imputed by the first substitute victim member to the elected member (by means of the election pointer), crediting the unworthy elected member as worthy.

Next, since the first substitute victim member position now contains the new second favored type of cache line, it must be protected. As indicated earlier, this is accomplished by making both election pointers equal to each other and setting the toggle bit to indicate which substitute victim member position should be protected.

Step 2079 sets the election pointer Elector Y (LRU bits 16–18 from FIG. 16) to point to the same member position as election pointer Elector X, thereby causing both pointers to protect the same doubly elected member position, which holds the first favored type of cache line. Step 2080 sets the toggle bit (LRU bit 19 from FIG. 16) to a "zero" value, thereby protecting the new second favored type of cache line held in the first substitute victim member position. Step 2061 indicates the completion of this case. Note that this case relies on novel features beyond those described with respect to the present invention with respect to a single substitute victim.

Referring back to FIGS. 17A–17B, if step 1749 determines that a second type of favored operation (Favored Y) missed the cache and that the fairly chosen victim member was elected by both election pointers (Elector X and Elector Y), control passes through step 1746 to step 2046 in FIGS. 20A–20B. As noted earlier, when both election pointers point to the same member, one of the substitute victim member positions is protected and the other is designated for substitute victimization. The value of the toggle bit indicates which one is protected. Referring now to FIGS. 20A–20B, control passes from step 2046 to step 2082. In step 2082, the toggle value is queried to determine which member will be victimized. Note that in this particular case, which is unlikely to occur in unbalanced caching scenarios, there is a 50% chance that the doubly elected member is victimized instead of a substitute victim member position. The immediate protection goals are superceded by the goal of establishing a stable toggle configuration.

If the toggle value is "one", the goal of the toggle configuration is to place (Favored Y) cache lines into the doubly elected member, (Favored X) cache lines into the second substitute victim member, and non-favored cache lines into the first substitute victim member. Therefore, if the toggle value is "one", since the current operation is a (Favored Y) operation, control passes to step 2070, which was described earlier, and which victimizes the doubly elected member even though it may contain a (Favored X) cache line.

If the toggle value is "zero", the goal of the toggle configuration is to place (Favored X) cache lines into the doubly elected member, (Favored Y) cache lines into the first substitute victim member, and non-favored cache lines into the second substitute victim member. Therefore, if the toggle value is "zero", since the current operation is a (Favored Y) operation, control passes to step 2075, which was described earlier, and which victimizes the first substitute victim member.

Note that this case relies on novel features beyond those described with respect to the present invention for single substitute victim.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method in a data processing system for processing a class of cache lines with a least recently used cache management process, the method comprising:
   selecting a first member in the class of cache lines as a substitute victim, wherein the substitute victim is unselectable by the least recently used cache management process and wherein the substitute victim is associated with a second member in the class of cache lines; and
   replacing the substitute victim in response to a selection of the second member as a victim when a cache miss occurs in the data processing system, wherein the second member remains in the class of cache lines.

2. The method of claim 1, wherein the second member is associated with the substitute victim using a pointer.

3. The method of claim 1, wherein the class of cache lines is defined by a least recently used tree.

4. The method of claim 1 further comprising:
   crediting a cache hit on the substitute victim back to the second member.

5. The method of claim 1, wherein the class is a congruence class.

6. The method of claim 5, wherein the congruence class includes nine members.

7. A data processing system comprising:
   a cache directory containing a class of cache lines; and
   victim selection logic connected to the class directory, wherein the victim selection logic selects a first member in the class of cache lines as a substitute victim, wherein the substitute victim is unselectable by the least recently used cache management process and wherein the substitute victim is associated with a second member in the class of cache lines; and replaces the substitute victim in response to a selection of the second member as a victim when a cache miss occurs in the data processing system, wherein the second member remains in the class of cache lines.

8. A data processing system for processing a class of cache lines with a least recently used cache management process, the method comprising:
   selecting means for selecting a first member in the class of cache lines as a substitute victim, wherein the substitute victim is unselectable by the least recently used cache management process and wherein the substitute victim is associated with a second member in the class of cache lines; and
   replacing means for replacing the substitute victim in response to a selection of the second member as a victim when a cache miss occurs in the data processing system, wherein the second member remains in the class of cache lines.

9. The data processing system of claim 8, wherein the second member is associated with the substitute victim using a pointer.

10. The data processing system of claim 8, wherein the class of cache lines is defined by a least recently used tree.

11. The data processing system of claim 8 further comprising:
    crediting means for crediting a cache hit on the substitute victim back to the second member.

12. The data processing system of claim 8, wherein the class is a congruence class.

13. The data processing system of claim 12, wherein the congruence class includes nine members.

14. A computer program product in a computer readable medium for processing a class of cache lines with a least recently used cache management process, the computer program product comprising:
    first instructions for selecting a first member in the class of cache lines as a substitute victim, wherein the substitute victim is unselectable by the least recently used cache management process and wherein the substitute victim is associated with a second member in the class of cache lines; and
    second instructions for replacing the substitute victim in response to a selection of the second member as a victim when a cache miss occurs in the data processing system, wherein the second member remains in the class of cache lines.

15. The computer program product of claim 14, wherein the second member is associated with the substitute victim using a pointer.

16. The computer program product of claim 14, wherein the class of cache lines is defined by a least recently used tree.

17. The computer program product of claim 14 further comprising:
    third instructions for crediting a cache hit on the substitute victim back to the second member.

18. The computer program product of claim 14, wherein the class is a congruence class.

19. The computer program product of claim 18, wherein the congruence class includes nine members.

* * * * *